US012718137B1

(12) United States Patent
Dasgupta et al.

(10) Patent No.: US 12,718,137 B1
(45) Date of Patent: Aug. 25, 2026

(54) MACHINE LEARNING ARTIFACT SHARING AND OPTIMIZED PIPELINE DEPLOYMENT

(71) Applicant: Amazon Technologies, Inc., Seattle, WA (US)

(72) Inventors: Sunny Dasgupta, Redmond, WA (US); Anirban Roy, Issaquah, WA (US); Naval Bhandari, Redmond, WA (US); Saurabh Mukund Trikande, Seattle, WA (US); Chacko P Daniel, Sammamish, WA (US); Rahee Sanjio Borade, Redmond, WA (US); Julio Andres Vargas Ramirez, Seattle, WA (US); Sabya Sachi, Seattle, WA (US); Divya Varshney, Seattle, WA (US); Ankit Aggarwal, Woodinville, WA (US); MD Bahlul Haider, Redmond, WA (US); Abhishek Kumar Agrawal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1181 days.

(21) Appl. No.: 17/116,005

(22) Filed: Dec. 9, 2020

(51) Int. Cl.
*G06N 20/00* (2019.01)
*G06N 7/01* (2023.01)

(52) U.S. Cl.
CPC ............... *G06N 20/00* (2019.01); *G06N 7/01* (2023.01)

(58) Field of Classification Search
CPC ................................. G06N 7/01; G06N 20/00
See application file for complete search history.

(56) References Cited

U.S. PATENT DOCUMENTS

| | | | |
|---|---|---|---|
| 9,135,559 B1 | 9/2015 | Chan et al. | |
| 10,102,480 B2 | 10/2018 | Dirac et al. | |
| 10,789,509 B2 | 9/2020 | Chan | |
| 10,824,959 B1 * | 11/2020 | Chatterjee | G06N 20/00 |
| 11,477,266 B1 * | 10/2022 | Paczkowski | H04W 76/11 |
| 2016/0110657 A1 | 4/2016 | Gibiansky et al. | |
| 2017/0124487 A1 | 5/2017 | Szeto et al. | |
| 2018/0341851 A1 | 11/2018 | Chung et al. | |
| 2019/0102700 A1 | 4/2019 | Babu et al. | |
| 2019/0325307 A1 * | 10/2019 | Li | G06N 3/08 |
| 2020/0019882 A1 | 1/2020 | Garg et al. | |
| 2020/0134476 A1 * | 4/2020 | Silva | G06F 8/36 |
| 2021/0286650 A1 * | 9/2021 | Henry | G06F 9/5027 |
| 2021/0367855 A1 * | 11/2021 | Pampaiah | H04L 43/0876 |

(Continued)

OTHER PUBLICATIONS

Derakhshan et al., "Optimizing Machine Learning Workloads in Collaborative Environments," in Proc. 2020 ACM SIGMOD Int'l Conf. Mgmt. of Data 1701-16 (2020). (Year: 2020).*

(Continued)

*Primary Examiner* — Ryan C Vaughn
(74) *Attorney, Agent, or Firm* — Robert C. Kowert; Kowert, Hood, Munyon, Rankin & Goetzel, P.C.

(57) ABSTRACT

In response to registration requests, metadata of a plurality of machine learning artifacts are stored. In response to a pipeline definition request, which does not specify resources to be used for the pipeline, a representation of a pipeline comprising nodes corresponding to registered artifacts is stored. A benchmarking operation is conducted to select the types of resources to be used for the nodes, and results of the benchmarking are provided.

20 Claims, 13 Drawing Sheets

(56) References Cited

U.S. PATENT DOCUMENTS

| | | | | |
|---|---|---|---|---|
| 2022/0012633 | A1* | 1/2022 | Molahalli | H04L 41/50 |
| 2023/0041582 | A1* | 2/2023 | Mutch | G06F 11/3466 |

OTHER PUBLICATIONS

Xiao et al., "Fashion-MNIST: a Novel Image Dataset for Benchmarking Machine Learning Algorithms," in arXiv preprint arXiv: 1708.07747 (2017). (Year: 2017).*

Asuncion et al., "Software Traceability with Topic Modeling," in 1 Proc. 32nd ACM/IEEE Int'l Conf. Software Engineering 95-104 (2010). (Year: 2010).*

Yocum et al., "Disdat: Bundle Data Management for Machine Learning Pipelines," in USENIX Conf. Operational Machine Learning 35-37 (2019). (Year: 2019).*

U.S. Appl. No. 17/105,993, filed Nov. 27, 2020, Nathalie Rauschmayr, et al.

* cited by examiner

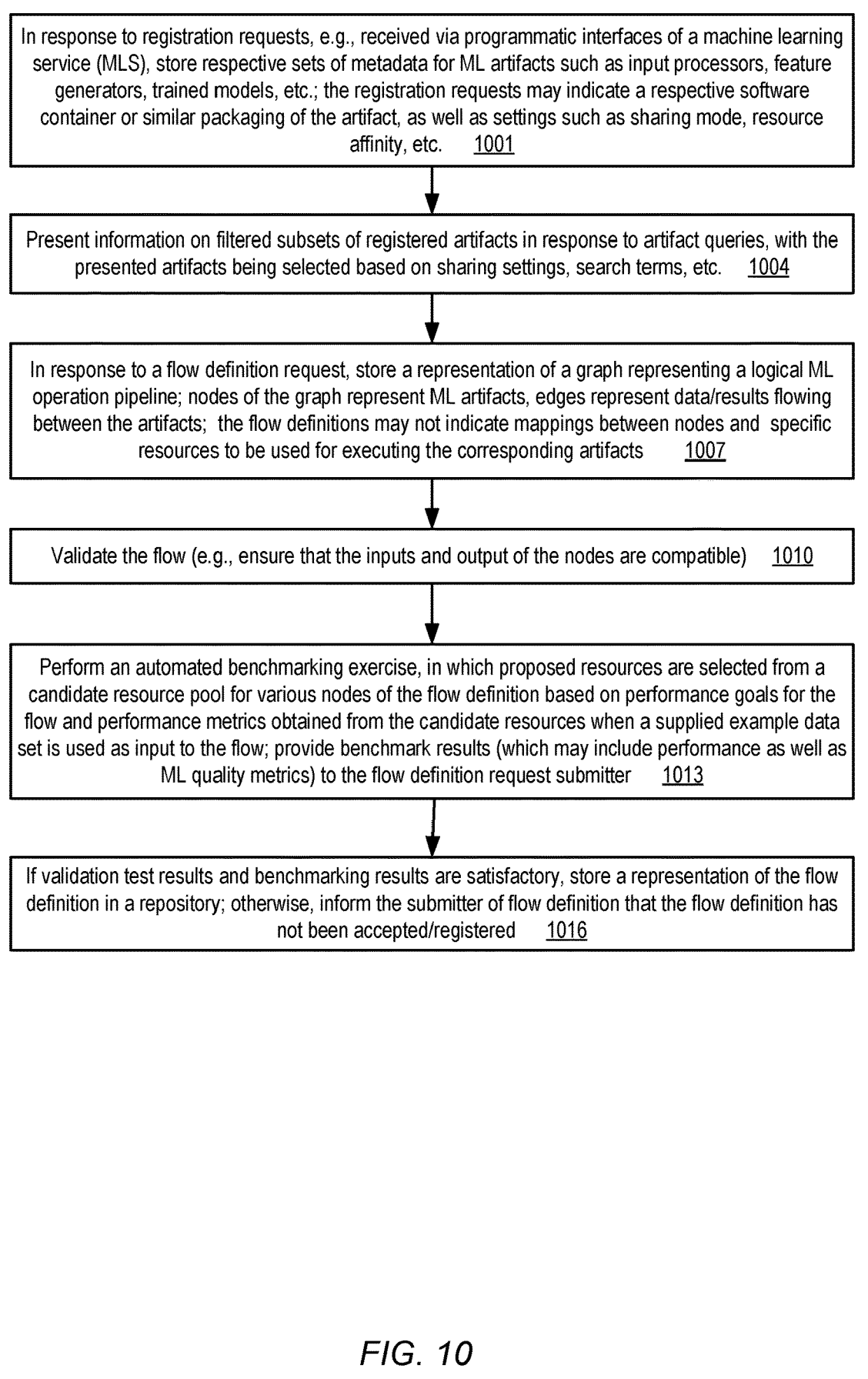

In response to registration requests, e.g., received via programmatic interfaces of a machine learning service (MLS), store respective sets of metadata for ML artifacts such as input processors, feature generators, trained models, etc.; the registration requests may indicate a respective software container or similar packaging of the artifact, as well as settings such as sharing mode, resource affinity, etc. 1001

Present information on filtered subsets of registered artifacts in response to artifact queries, with the presented artifacts being selected based on sharing settings, search terms, etc. 1004

In response to a flow definition request, store a representation of a graph representing a logical ML operation pipeline; nodes of the graph represent ML artifacts, edges represent data/results flowing between the artifacts; the flow definitions may not indicate mappings between nodes and specific resources to be used for executing the corresponding artifacts 1007

Validate the flow (e.g., ensure that the inputs and output of the nodes are compatible) 1010

Perform an automated benchmarking exercise, in which proposed resources are selected from a candidate resource pool for various nodes of the flow definition based on performance goals for the flow and performance metrics obtained from the candidate resources when a supplied example data set is used as input to the flow; provide benchmark results (which may include performance as well as ML quality metrics) to the flow definition request submitter 1013

If validation test results and benchmarking results are satisfactory, store a representation of the flow definition in a repository; otherwise, inform the submitter of flow definition that the flow definition has not been accepted/registered 1016

*FIG. 10*

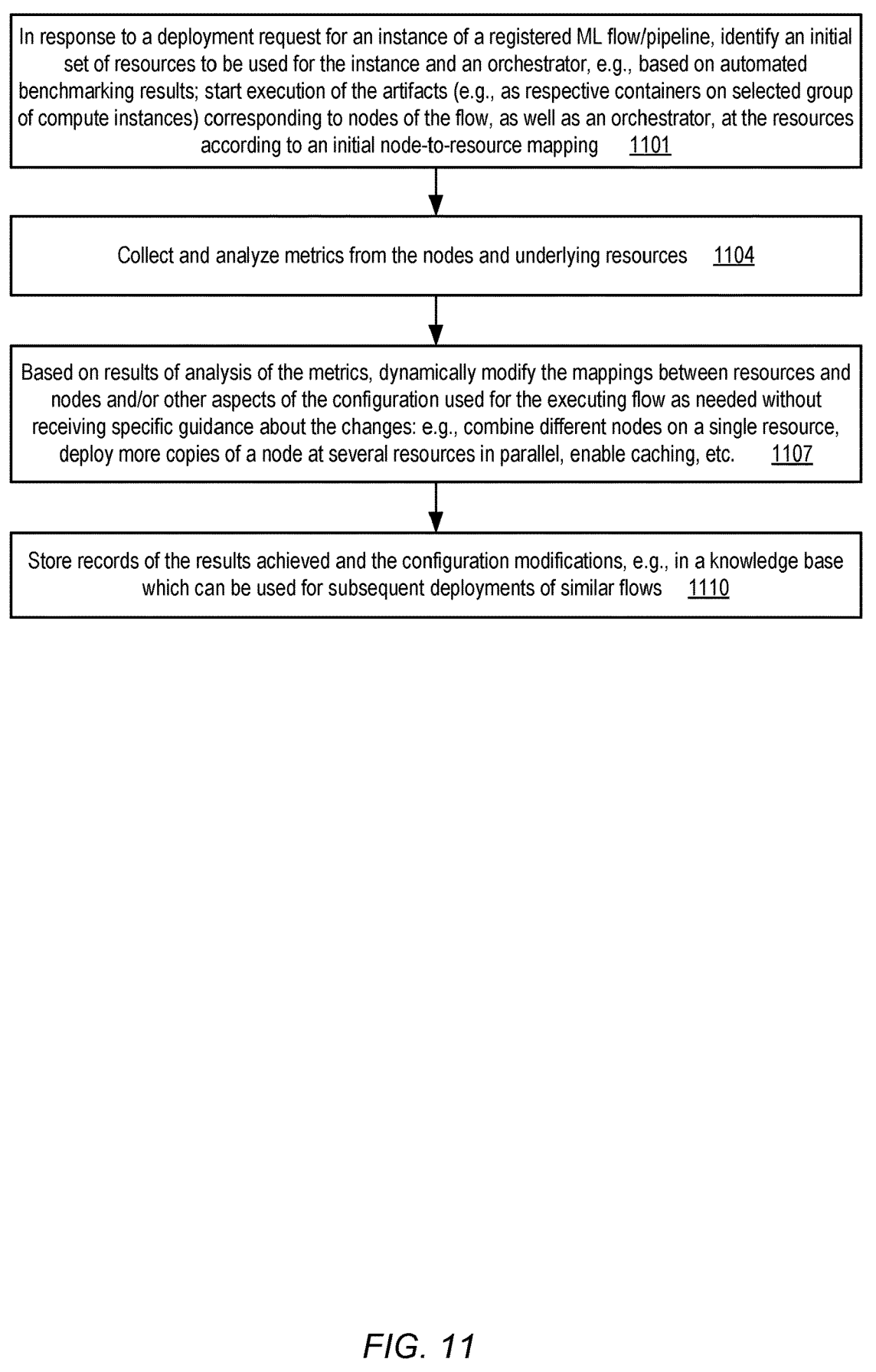

In response to a deployment request for an instance of a registered ML flow/pipeline, identify an initial set of resources to be used for the instance and an orchestrator, e.g., based on automated benchmarking results; start execution of the artifacts (e.g., as respective containers on selected group of compute instances) corresponding to nodes of the flow, as well as an orchestrator, at the resources according to an initial node-to-resource mapping 1101

Collect and analyze metrics from the nodes and underlying resources 1104

Based on results of analysis of the metrics, dynamically modify the mappings between resources and nodes and/or other aspects of the configuration used for the executing flow as needed without receiving specific guidance about the changes: e.g., combine different nodes on a single resource, deploy more copies of a node at several resources in parallel, enable caching, etc. 1107

Store records of the results achieved and the configuration modifications, e.g., in a knowledge base which can be used for subsequent deployments of similar flows 1110

*FIG. 11*

MACHINE LEARNING ARTIFACT SHARING AND OPTIMIZED PIPELINE DEPLOYMENT

BACKGROUND

The use of machine learning algorithms is becoming increasingly popular for addressing numerous types of problems, including text analysis, image analysis and the like. Deep learning machine learning models, comprising multiple layers of neural networks, have been extremely successful in a number of problem domains. Such deep neural network based models (DNNs) discover several categories of salient characteristics of the input data, starting with low-level features at initial layers (such as rough boundaries between objects or regions in the case of image processing applications) and ending with fine-grained characterization of the input (e.g., distinguishing between different faces or animals) at the final layers closest to the output of the models.

The process of training and testing of DNNs and other complex models often involves many different stages and can take a substantial amount of time. The stages can include ingestion/acquisition of the training input data, cleansing or standardization of the input, feature processing to generate derived features, computations of various phases/iterations of the learning algorithms selected, and so on. In some cases, the same type of model may be trained several times, e.g., to try out different hyper-parameter combinations. Some stages of a training pipeline can be parallelized. Often, different types of computing devices may be preferred for different training pipeline operations—e.g., some of the operations may be performed more effectively on GPUs (graphics processing units) than on conventional CPUs.

Generating high quality machine learning models as rapidly as possible is an important goal for many organizations. Speeding up the training of complex machine learning models remains a challenging technical problem, however, partly due to the varying resource needs of the different pipeline operations involved.

BRIEF DESCRIPTION OF DRAWINGS

FIG. 10 is a flow diagram illustrating aspects of operations that may be performed to register machine learning artifacts and define machine learning flows at a network-accessible machine learning service, according to at least some embodiments.

FIG. 11 is a flow diagram illustrating aspects of machine learning flow deployment related operations that may be performed at a network-accessible machine learning service, according to at least some embodiments.

Figure 1:
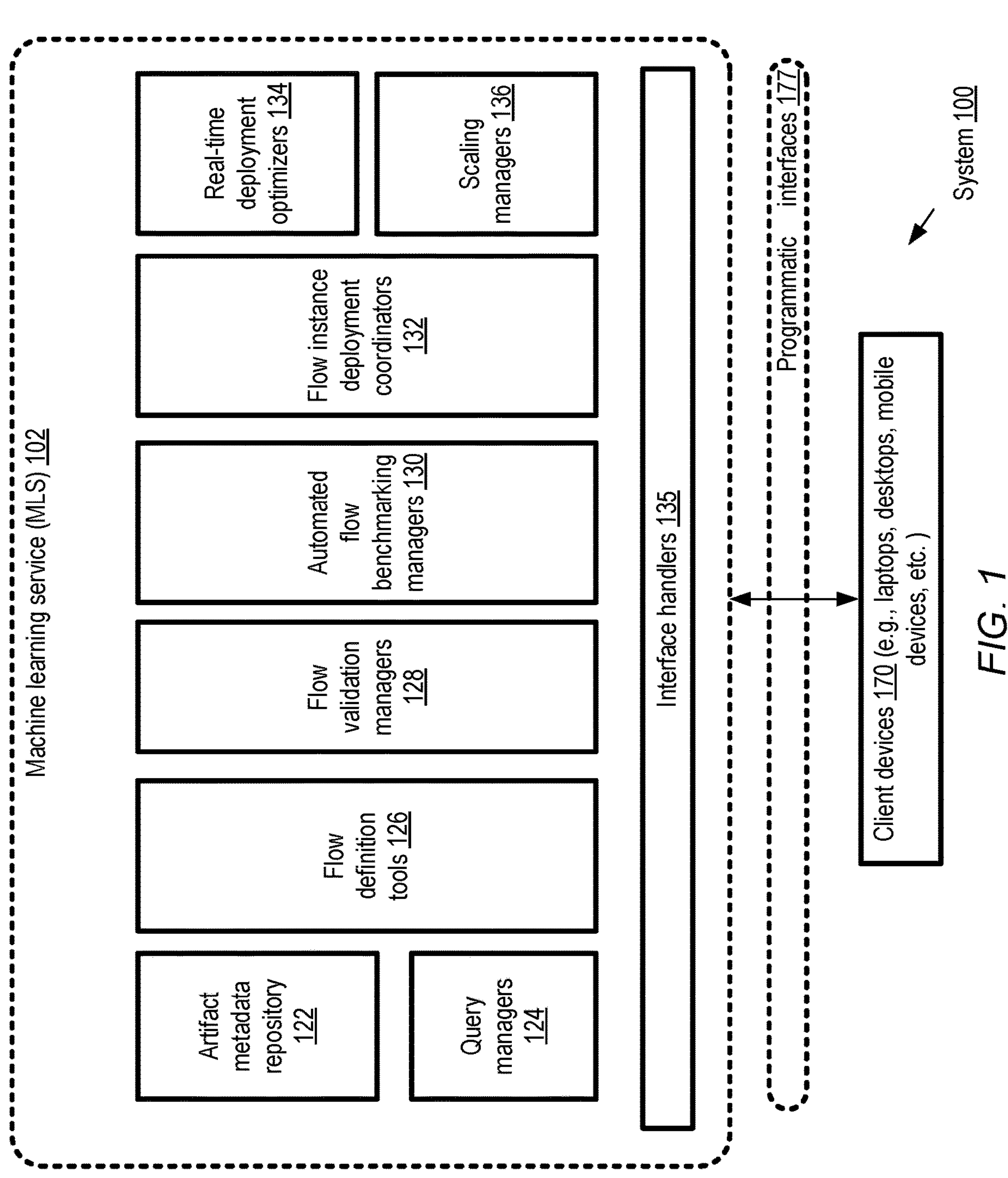
FIG. 1 illustrates an example system environment in which a machine learning service may be implemented which supports controlled sharing of machine learning artifacts, tools for defining and automatically benchmarking flows of pipelined artifacts, as well as real-time optimization of executions of the flows, according to at least some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word “may” is used in a permissive sense (i.e., meaning having the potential to), rather than the mandatory sense (i.e., meaning must). Similarly, the words “include,” “including,” and “includes” mean including, but not limited to. When used in the claims, the term “or” is used as an inclusive or and not as an exclusive or. For example, the phrase “at least one of x, y, or z” means any one of x, y, and z, as well as any combination thereof.

DETAILED DESCRIPTION

The present disclosure relates to methods and apparatus for controlled sharing of machine learning artifacts, defining and automatically benchmarking flows or pipelines of artifacts, as well as real-time optimization of executions of instances of the flows. Support for such functionality may be provided at least in part at a network-accessible machine learning service of a provider network or cloud computing environment in some embodiments. The functionality may be utilized by several groups of stakeholders involved in the development and use of machine learning models for production applications, including data scientists, application deployment engineers and the like, especially in large organizations at which many different groups of employees may often be involved in machine learning related tasks. It may sometimes be the case that some machine learning artifacts such as input data pre-processing programs, feature generators which produce derived features from input data, trained models, model output transformation tools and the like, which were developed by one set of employees of an organization for a particular use case, may also potentially be useful for other use cases. The proposed techniques enable the sharing of such artifacts based on sharing policies selected by the artifact creators, simplified construction of flows or pipelines from the artifacts, unsupervised benchmarking of the constructed flows, and dynamic modification of the mappings of artifacts to resources during execution. By using the proposed functionality, data scientists may be able to focus on designing the best possible machine learning pipelines or flows, without having to concern themselves with deployment details. As one concrete example, data scientists involved in designing different aspects of autonomous vehicles may independently create several different specialized machine learning models, such as a model to identify road signs, another model to identify and interpret traffic lights, another model to detect the direction of motion of other vehicles on the road, and so on; all these models may then be combined as needed in a pipeline to help achieve the overall goal of safely navigating a given autonomous vehicle. At the same time, engineers tasked with deployment management may not have to conduct manual benchmarking of machine learning flows, configure network paths between per-artifact network endpoints of the flows, or keep monitoring performance of the components of the flows to ensure that resources on which the artifacts are run are being used as efficiently as possible.

As one skilled in the art will appreciate in light of this disclosure, certain embodiments may be capable of achieving various advantages, including some or all of the following: (a) substantially reducing the overall amount of computation, storage and networking resources required to run complex machine learning pipelines to obtain high quality inferences for a variety of application domains including image processing, text processing and the like, (b) improving the user experience of data scientists, e.g., by enabling the data scientists to quickly determine whether machine learning artifacts which can be repurposed for new applications or use cases are available, and to easily define (e.g., via graphical user interfaces) pipelines using combinations of such pipelines, and/or (c) improving the user experience of other stakeholders in the development and use of machine learning, by eliminating tasks such as manual benchmarking of newly-defined pipelines, reducing the amount of effort required to configure resources for such pipelines, and reducing the amount of performance analysis needed from the stakeholders for the pipelines.

According to some embodiments, a system may comprise one or more computing devices, e.g., of a network-accessible machine learning service (MLS) of a provider network or cloud computing environment. The computing devices may include instructions that upon execution on or across the one or more computing devices cause the one or more computing devices to store, in response to artifact registration requests, respective metadata of various machine learning artifacts (such as trained models, feature processors/generators, pre-processors/transformers for model inputs, post-processors/transformers for model outputs and the like). Any combination of several categories of metadata may be stored for a given artifact in various embodiments, such as sharing settings (indicating whether the artifact is to be accessible to clients of the machine learning service other than the creator of the artifact, and if so, rules governing such shared accesses), resource affinity indicators (e.g., indicating that CPU-based or GPU-based computing devices are better suited, from a performance perspective, for executing the artifact), and so on. In at least some embodiments, the submitter of an artifact registration request may indicate one or more software containers (or similar software packaging and virtualization units) comprising at least some of the software to be executed to perform the functionality of the artifact. The MLS may validate the artifacts indicated in the artifact registration requests in various embodiments (e.g., by confirming that the software containers satisfy a pre-published set of requirements for registration) and, if the artifacts satisfy the validation criteria, include the artifacts and associated metadata in a searchable database or registry of artifacts.

In response to an artifact query or search request from a client, the MLS may present an indication of at least a subset of the registered artifacts in various embodiments. Individual ones of the artifacts may be included in the presented subset based at least in part on factors such as the sharing settings of the artifacts, attributes indicated in the query or search request (such as a requested category of artifacts, a target use case or application, etc.), the identity of the requester, and so on. In effect, designers of machine learning flows may query the artifact registry to determine if they can reuse or repurpose previously registered artifacts as components of new flows without having to re-generate the artifacts from scratch themselves. In some cases, similarity detection algorithms (including machine learning models) may be employed at the MLS to determine whether a target application use case indicated in an artifact search request is sufficiently similar to the application use case stored as part of the metadata of a registered artifact to include the registered artifact in a response to the search request.

In various embodiments, clients of the MLS (e.g., data scientists who accessed the registered artifacts) may submit flow definition requests to the MLS via programmatic interfaces. In response to such a flow definition request, in some embodiments the MLS may store a representation of a flow comprising a directed acyclic graph (DAG) of nodes. Individual nodes may correspond to respective registered artifacts in some embodiments; as such, the terms "artifact" and "flow node" may be used interchangeably herein. In one embodiment, the flows may be defined by an MLS client using drag-and-drop elements of graphical user interfaces of the MLS. In other embodiments, markup languages, scripting languages, programming languages, and/or a custom flow definition language supported by the MLS may be used. A flow definition request may not provide a mapping between individual nodes and the resources to be employed for the individual nodes when the flow is deployed in at least some embodiments. As such, a flow definition may represent a logical construct in such embodiments, and execution of an instance of the flow definition may require the identification of resources to be used for the nodes or artifacts of the flow definition.

In at least some embodiments, the submitted flow definition may first be validated at the MLS before the definition is accepted or registered. A number of different types of validation operations may be performed in different embodiments, such as verifying that if a given node N1's output is to be consumed as input by another node N2 in the DAG of the flow, the input signature or specification of N2 is compatible with the output signature or specifications of N1.

According to some embodiments, when an MLS client submits a flow definition, an automated benchmarking exercise or operation may be conducted at the MLS for the flow definition, e.g., without an explicit request to conduct such benchmarking. The benchmarking may include executing constituent nodes/artifacts of the flow at several different combinations of resources (such as compute instances with differing performance capabilities), selected for example from a pool of resources available for the flow definition based on the resource affinities of the artifacts. In some implementations, the client submitting the definition may indicate the pool of available resources or resource types, or the pool of resources may be inferred or identified by the MLS based on the identity (e.g., user identifier or account identifier) of the flow definition submitter. In at least some embodiments, an initial set of performance objectives to be obtained from the flow using a specified input data set may be provided to the MLS by a client, and the MLS may try out different combinations of available resources for various nodes of the flow in an attempt to achieve (or come as close as possible to achieving) the performance objective as part of the benchmarking exercise. During the benchmarking, different types of resources may be selected for at least some nodes of the flow in some cases—for example, while one or more nodes may be mapped to one resource type with a particular performance profile and functional capability profile, another group of one or more nodes may be mapped to another resource with a different performance profile and functional capability profile. In one example scenario, the hardware stack, operating system or virtualization management stack components of a resource type selected during benchmarking for a particular group of one or more nodes of the flow may differ from the hardware stack, operating system or virtualization management stack components of another resource type selected during benchmarking for different group of flow nodes of the same flow. Results of the benchmarking, including achieved performance of an instance of the flow definition on a selected set of resources, as well as metrics of machine learning quality obtained during the benchmarking, may be provided to the client who submitted the flow definition in various embodiments. The results may also be stored as part of the metadata of the flow definition itself, and may be accessed by clients of the MLS (who are authorized to view the results) via programmatic interfaces of the MLS in some embodiments.

In at least one embodiment, one or more expected execution modes may also be specified for a given flow definition. For example, a given flow may be intended to be used in an online execution mode, a streaming execution mode, a batch execution mode, or some combination of such modes in some embodiments. In the online mode, a result of the flow for a particular input record or set of input records may be provided in real time, e.g., using the same network connection on which the input data are received at the set of resources designated for the flow. In streaming mode, potentially long-lasting streams of input records may be ingested at the set of resources, and corresponding long-lasting streams of results may be provided. In batch or bulk mode, a large set of input data may be specified for a flow in a single inference job request, and the results of the entire job may be provided when they become available. In some embodiments, the execution modes may also be referred to as input ingestion modes. In at least some embodiments, one or more configuration settings of the automated benchmarking operation may be selected based on the intended or expected execution modes of the definition—e.g., the specific categories of compute instances to be tried for a given node may be selected based on the execution mode(s).

After the flow definition is validated and benchmarked, it may be accepted at the MLS and included in a database of registered flows in various embodiments. In at least some embodiments, analogous sharing settings may be specified by the flow definition submitters to those submitted by the artifact registration requesters.

An authorized MLS client may submit a deployment request indicating a registered flow definition in some embodiments. In response, an instance of the flow definition may be deployed at a set of resources, e.g., using an initial mapping between individual nodes of the flow definition and the resources on which those nodes are executed. The initial mapping may be selected, for example, based on results obtained from the benchmarking, based on resource preferences in the deployment request or an available resource pool identified for the requesting client, and/or based on one or more other factors in different embodiments. In effect, in some embodiments, the benchmarking results may suggest the categories of resources to be used, at least initially, for an instance of a flow, and the actual resources (of the suggested categories) may be selected in response to a deployment request, e.g., after the benchmarking is complete. In some cases, the set of resources available at the time of the deployment request may not necessarily include all the resource types proposed or recommended in the benchmarking; in such cases, the MLS may choose a resource of a different resource type from among the available resources at deployment request time (e.g., a resource that has capabilities as close as possible to the recommended resource) for a given node or set of nodes of the flow instance. In at least some embodiments, even though the flow may comprise numerous interconnected nodes, a single network endpoint (or a small set of network endpoints) may be configured for interactions with the end users of the flow—e.g., a single URI (universal resource identifier) or IP (Internet protocol) address may be set up for receiving input data and for transmitting results of the flow instance. The network endpoint (or endpoints) set up for the instance of the flow may be provided to the submitter of the deployment request in various embodiments.

In some embodiments, the MLS may collect a variety of performance metrics (e.g., network transfer rates between various nodes, network latencies, CPU or GPU utilization levels, memory utilization levels, storage I/O rates, etc.) from the set of resources deployed for the flow instance, as well as start and end times of various phases of the logical machine learning operations being performed in the pipeline. Based at least in part on an analysis of the metrics and/or on one or more optimization objectives (e.g., minimizing the time at which inference results can be obtained from the flow instance, reducing the number of distinct compute instances of a particular type used for the flow instance, etc.) a decision may be made to modify the mappings between the nodes of the flow and the underlying resources in various embodiments. In a modified mapping, at least one node of the flow may be executed at a different resource from the resource it was being executed on earlier. In effect, the MLS may automatically take various types of performance optimization actions in such embodiments, such as combining multiple nodes of the flow onto a single compute instance or host (e.g., to reduce networking-related delays), deploying additional compute instances to parallelize some flow node operations, adding caching or prefetching operations for intermediate results or data, and so on.

According to some embodiments, as suggested earlier, a machine learning service which provides the artifact and flow management techniques introduced above may be implemented at a provider network. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as the machine learning service (which may also be referred to as an analytics service). A VCS may also be referred to as an elastic compute service, virtual machines service, computing cloud service, compute engine, and/or cloud compute in various implementations. Virtual machines of the VCS may also be referred to as compute instances.

Example System Environment

FIG. 1 illustrates an example system environment in which a machine learning service may be implemented which supports controlled sharing of machine learning artifacts, tools for defining and automatically benchmarking flows of pipelined artifacts, as well as real-time optimization of executions of the flows, according to at least some embodiments. As shown, system 100 of FIG. 1 comprises resources and artifacts of a machine learning service (MLS) 102, including for example an artifact metadata repository 122, query managers 124, flow definition tools 126, flow validation managers 128, automated flow benchmarking managers 130, flow instance deployment coordinators 132, real-time deployment optimizers 134, scaling managers 136 and interface handlers 135. Each of these subcomponents may be implemented using one or more computing devices in various embodiments.

The MLS 102 may implement a collection of programmatic interfaces 177 in the depicted embodiment, comprising for example one or more web-based consoles, a set of application programming interfaces (APIs), command-line tools, graphical user interfaces and the like. Such interfaces may be utilized by clients of the MLS to submit various types of messages or requests pertaining to the creation and execution of machine learning flows or pipelines, including for example flows for training various models as well as flows for executing trained versions of the models. MLS clients may include, for example, data scientists, flow deployment engineers, end users of the applications built using one or more machine learning algorithms, and/or other entities involved in the preparation and use of machine learning flows for various organizations in the depicted embodiment. Requests or messages may be transmitted, for example, from a variety of client devices 170 in different embodiments, such as desktops, laptops, mobile devices and the like. The requests may be received by interface handlers 135 in the depicted embodiment. The interface handlers 135 may then transmit internal versions of the requests/messages to other subcomponents of the MLS 102, receive responses from the other subcomponents and pass them on to the clients via the programmatic interfaces 177.

A client of the MLS may utilize programmatic interfaces 177 to submit an artifact registration request, indicating various properties and attributes of a machine learning artifact such as an input data pre-processor, a feature generator, a model to be trained, a trained version of a model, or a model output post-processor. The attributes of the artifacts may include, for example, a sharing setting, a resource affinity setting, and the like. In one implementation, for example, the sharing setting could be one of the set of "private", "public" or "shared with restrictions" settings. The "private" setting may for example indicate that the artifact is not to be accessed by an entity other than the submitter of the registration request. The "public" setting may indicate that the artifact is to be made accessible to any client of the MLS 102, while the "shared with restrictions" setting may indicate that the artifact is to be made accessible to specified group of clients other than the registration requester (such as other clients belonging to the same organization as the registration requester). Different sharing settings may be specified for respective artifacts generated by the same MLS client in various embodiments. Resource affinity settings could indicate one or more types of resources (e.g., a particular category of compute instance of a virtualized computing service) which are deemed suitable for the artifact by the registration requester. For example, some artifact algorithms may run better on servers equipped with a large number of graphical processing units (GPUs) and relatively few CPUs, another algorithm may run well on a server with a large number of CPUs but may not need GPUs, another may require fast random I/O or fast sequential I/O, and so on. In at least some embodiments, at least some of the software (e.g., executable programs, libraries, configuration files etc.) implementing an artifact may be packaged in the form of a software container, or in using some other software virtualization and packaging technique, and the registration request may indicate the container or virtualization package for the artifact. In at least one embodiment, a network address or unique container identifier which can be used to retrieve the artifact for validation, sharing and execution may be specified in the registration request. In some embodiments, the packaged version of an artifact, indicated in the registration request, may be immutable by the MLS 102. Any of various formats for immutable executable images may be used for the artifacts. In response to the registration request, in one embodiment a set of validation tests may be conducted, e.g., to ensure that the artifact complies with a set of artifact API requirements of the MLS, and metadata indicating the artifact and its attributes may be stored in artifact metadata repository 122. An artifact whose metadata have been saved in repository may be referred to as a registered artifact.

Depending on the sharing settings of the registered artifacts, other clients may be able to view at least a subset of the artifacts whose metadata have been stored in the depicted embodiment, and if desired, utilize the artifacts to define new flows or modify existing flow definitions. Clients may submit various types of artifact queries or search requests to view available registered artifacts which meet specified criteria, and query managers 124 may present a list of artifacts which (a) meet the specified criteria and (b) are accessible to the client based on sharing settings in the depicted embodiment. In one embodiment, search indexes may be created on various attributes of the artifacts (such as the artifact category, resource affinities, use cases for which the artifacts were designed, etc.) and used to respond to the artifact queries.

In various embodiments, one or more types of flow definition tools 126 may be accessed by MLS clients via programmatic interfaces 177. In some embodiments, for example, a tool may present representations (e.g., icons) via a graphical user interface of various registered artifacts to which a client has access, and the graphical user interface may include interactive components (e.g., drag-and-drop interfaces) which can be used to construct a graph depicting multiple artifacts which collectively form a desired pipeline or flow of machine learning operations. In other embodiments, a client may be able to specify a flow using a markup language or a scripting language; that is, a tool 126 may accept descriptors of flows expressed using such languages in addition to or instead of providing a graphical interface usable to define flows. In response to a flow definition request submitted via programmatic interfaces 177 to a flow definition tool 126, the MLS 102 may store a representation of a machine learning flow comprising a directed acyclic graph (DAG) in various embodiments. The DAG may comprise a plurality of nodes corresponding to individual registered artifacts, with edges between the nodes indicating the flow of data (such as derived features, intermediate results, etc.) between the artifacts. The flow definition request may provide a logical view of the relationships between the artifacts which are to be used together for a particular machine learning application, and may not provide a mapping between individual nodes and the specific resources to be employed for the individual nodes in various embodiments. In at least some embodiments, the submitter of a flow definition may supply an example input data set for the flow (e.g., a set of records which can be provided as input to an input-handling artifact of the flow to exercise or test the logic of the flow as a whole).

According to at least some embodiments, before accepting a flow definition, a number of operations may be performed at the MLS 102. For example, flow validation managers 128 may conduct one or more validation tests, checking for example that the output signature or specification of each node N1 which sends data to other nodes N2, N3, . . . , match the input signatures or specifications of the data recipient nodes N2, N3, etc. In addition, in at least some embodiments, flow validation managers 128 may try to ensure that the type of input data (e.g., image vs. text) expected by the flow as a whole is compatible with the kind of output produced by the flow (e.g., image classification results vs. predictions of the next token of a text sequence), and with an example set of input data indicated by the flow submitter for the flow. Other types of validation tests may also be conducted in some embodiments.

In various embodiments, an automated benchmarking operation or procedure may be conducted with respect to a flow definition by automated flow benchmarking manager 130. The automated benchmarking operation may attempt to select, from among a pool 150 of available resources for running various registered artifacts, a particular set of resources which are suitable for executing the flow to meet a set of performance goals. The pool of resources may include resources with different performance and/or functional capabilities in various embodiments, so that the requirements of the artifacts of various flows can be satisfied (while minimizing overall resource consumption and cost) by selecting the appropriate combination of resources. For example, based on the resource affinity settings for artifacts corresponding to the nodes of the flow definition, as well as the performance achieved, a particular GPU-dominated computing resource (e.g., a particular type of compute instance which has several GPUs, from among several instance types which have differing GPU capabilities) may be selected for one node, while a resource which does not have GPUs may be found suitable for another node. In at least some embodiments, an initial set of performance goals may be provided by the submitter of the flow definition request. After the flow has been validated and benchmarked, a representation of the flow definition may be stored at the MLS 102 in various embodiments, e.g., in a separate flow repository or in artifact metadata repository 122. The results of the benchmarking may be stored at the MLS and/or provided to the flow definition submitter in various embodiments. In at least one embodiment, the benchmarking results may include not just performance data (e.g., how long it took to obtain predictions from a flow comprising a trained model for an input data set) but also model inference result quality data (e.g., the precision or recall for a classification flow).

Flow definitions which have been successfully validated and benchmarked may be referred to as registered flow definitions. In various embodiments, each registered flow may also have its own set of sharing settings, analogous to those of individual artifacts, indicating the set of clients who are permitted to access, modify and/or request deployment of instances of the registered flow. Query managers 124 may also respond to queries or search requests for flow definitions in various embodiments, providing query responses which list the set of flow definitions which satisfy predicates of submitted queries. Clients may, for example, search for flow definitions by name, by problem domain, by creator, by creation data, or based on various other criteria.

A MLS client with permission to execute a registered flow may submit a deployment request for an instance of the flow definition via programmatic interfaces 177 in the depicted embodiment. Note that a number of different instances (executions using respective resource sets) of a single flow definition may be run in various embodiments. The flow definitions may each be considered respective logical equivalents of an executable program, and the instances of the flow may be considered logical equivalents of executions of the programs. In response to the deployment request, a flow instance deployment coordinator 132 may select an initial mapping between the nodes/artifacts of the specified flow definition and a group of resources selected from artifact deployment resource pools 150 in various embodiments. The initial mapping may indicate, for each node of the flow definition, which particular resource is to be used to execute the corresponding artifact. In at least some embodiments, the initial mapping may be generated based at least in part on the benchmarking results.

After the instance of a flow has been deployed using an initial mapping at a subset of resources from resource pools 150, in various embodiments metrics may be collected from the running instance of the flow by real-time deployment optimizers 134. The metrics may include resource utilization metrics (e.g., CPU utilization, GPU utilization, memory utilization, network bandwidth utilization, I/O device utilizations etc.), latency metrics, network traffic metrics, metrics indicative of start and end times of various logical steps of the flow, and the like. In some embodiments, a given flow instance may be run in any of several execution modes, such as online mode, streaming mode or batch/bulk mode, and metrics corresponding to the execution mode may be collected by the real-time deployment optimizers 134. For example, in online mode, the response times for obtaining a result from the flow instance to individual input records may be collected. In streaming mode, the throughput in terms of streaming results per unit time may be an important metric to be collected, while in batch mode, the total time taken to complete processing of a batch of thousands of input records may be collected, and so on. Based on the collected metrics and/or performance or resource utilization goals indicated by the client on whose behalf an instance of a flow is deployed, the real-time deployment optimizers may change the deployment configuration of the flow instance in several ways in some embodiments. For example, two or more nodes of the flow which were being executed on separate resources may be migrated to a single resource, more resources may be deployed to host multiple copies of a given node which can be run in parallel, caching or pre-fetching features may be activated at various nodes, and so on. The clients on whose behalf the instance was deployed may not have to worry about monitoring or analyzing the metrics; instead, the MLS may optimize the deployment of the flow automatically in various embodiments based on specified performance goals or resource consumption guidelines and the available set of resources.

In some embodiments, at least a subset of artifact deployment resource pools 150 may be managed and scaled as needed by the MLS on behalf of MLS clients. In one such embodiment, a scaling manager 136 may be responsible for ensuring that the appropriate number of physical and/or virtual resources of different types are configured within the pools 150 for the flows of the MLS clients to run with desired levels of performance. Both vertical and horizontal scaling may be implemented by the scaling managers 136 in at least some embodiments. In vertical scaling, as traffic directed to a particular machine learning artifact increases, more hosts or compute instances which can be used most effectively for the artifact (as indicated for example by the resource affinity setting of the artifact) may be added to a pool. For example, more compute instances which provide powerful GPUs may be added automatically by a scaling manager as more flows using a particular type of artifact which works better with GPUs are deployed. In horizontal scaling, a scaling manager may ensure that enough physical or virtual resources of different types (e.g., compute instances with several powerful GPUs, compute instances with fewer GPUs but many powerful CPUs, compute instances with high I/O performance capacity, compute instances with large main memories, etc.) are configured within a pool 150 over time to handle flows whose nodes need a variety of performance capabilities and functional capabilities.

Example Artifact Metadata

Figure 2:
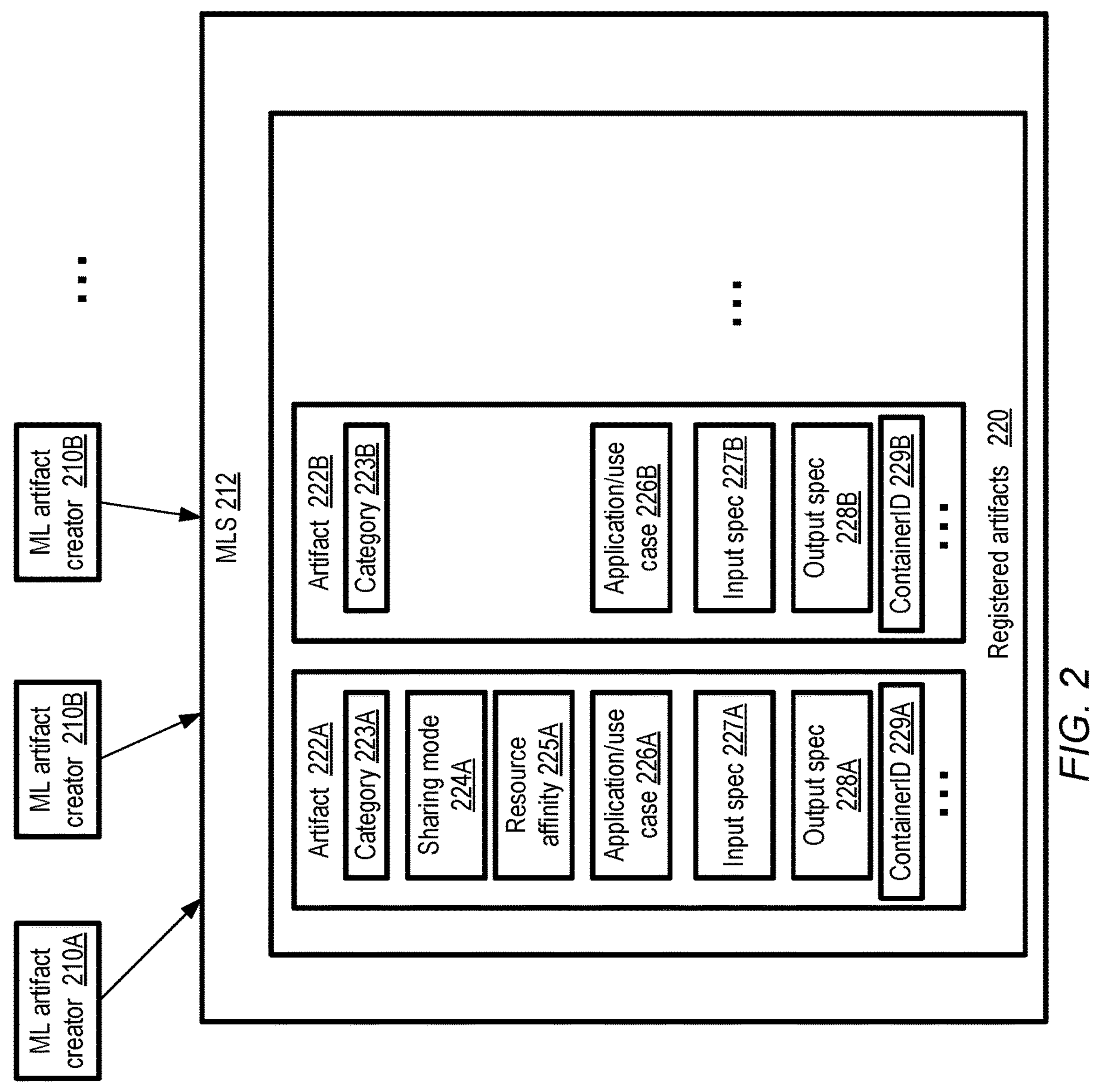
FIG. 2 illustrates examples of artifact metadata which may be stored at a machine learning service, according to at least some embodiments.

FIG. 2 illustrates examples of artifact metadata which may be stored at a machine learning service, according to at least some embodiments. Machine learning artifacts of a number of different categories 290 may be managed with the help of a machine learning service (MLS) 212 similar in functionality to MLS 102 of FIG. 1 in various embodiments. The categories may include, among others, input pre-processors 201, derived feature generators 202, model trainers 203, trained models 204, model output transformers 205 in the depicted embodiment.

Software and configuration settings for running/executing an artifact may be generated and packaged into a self-contained unit such as a software container in various embodiments by an ML artifact creator 210 (such as ML artifact creators 210A, 210B or 210C). The ML artifact creators 210 (one of the categories of clients of the MLS 212) may submit respective artifact registration requests to the MLS via programmatic interfaces, indicating various attributes and properties of the artifacts. After validating an artifact (e.g., ensuring that the artifact satisfies formatting and API standards of the MLS) indicated in a registration request, the MLS may add the artifact to a repository of registered artifacts 220 in the depicted embodiment.

Several types of metadata stored for a given artifact 222 at the MLS 212. For example, for registered artifact 222A the metadata may include the category 223A of the artifact, a sharing mode 224A, resource affinity 225A, information about the use case or application 226A for which the artifact was created, an input specification 227A, an output specification 228A and a container identifier 229A. The input specification may also be referred to as the input signature, and may indicate the expected schema or format of input records for the artifact; similarly, the output specification or signature may indicate the expected schema or format of the output produced by the artifact. The container identifier may, for example, be used to obtain a machine image for the artifact from a specified container management service in some embodiments.

At least a subset of the metadata may be supplied in the artifact's registration request by the artifact creator 210 in various embodiments. In other embodiments, one or more of the elements of the metadata may not be supplied by the artifact creator, and may be inferred by the MLS (and in some cases confirmed by the artifact creator) if needed. Furthermore, the combination of metadata elements stored at the MLS 212 for some artifacts may differ from the combination of elements stored for other artifacts. For example, while artifact 222B's metadata includes a category 223B, an application/user case 226B, an input specification 227B, an output specification 228B and a container identifier 229B, elements indicating a sharing mode and a resource affinity are not present for artifact 222B. In at least some embodiments, default settings may be used for some metadata elements such as sharing mode or resource affinity if such information is not specified in the registration request—e.g., by default, the sharing mode may be set to "private" to indicate that only the submitter of the registration request has rights to the artifact. Other types of metadata, not shown in FIG. 2, may be stored for various artifacts at the MLS in some embodiments.

Example Flow Definition Process

Figure 3:
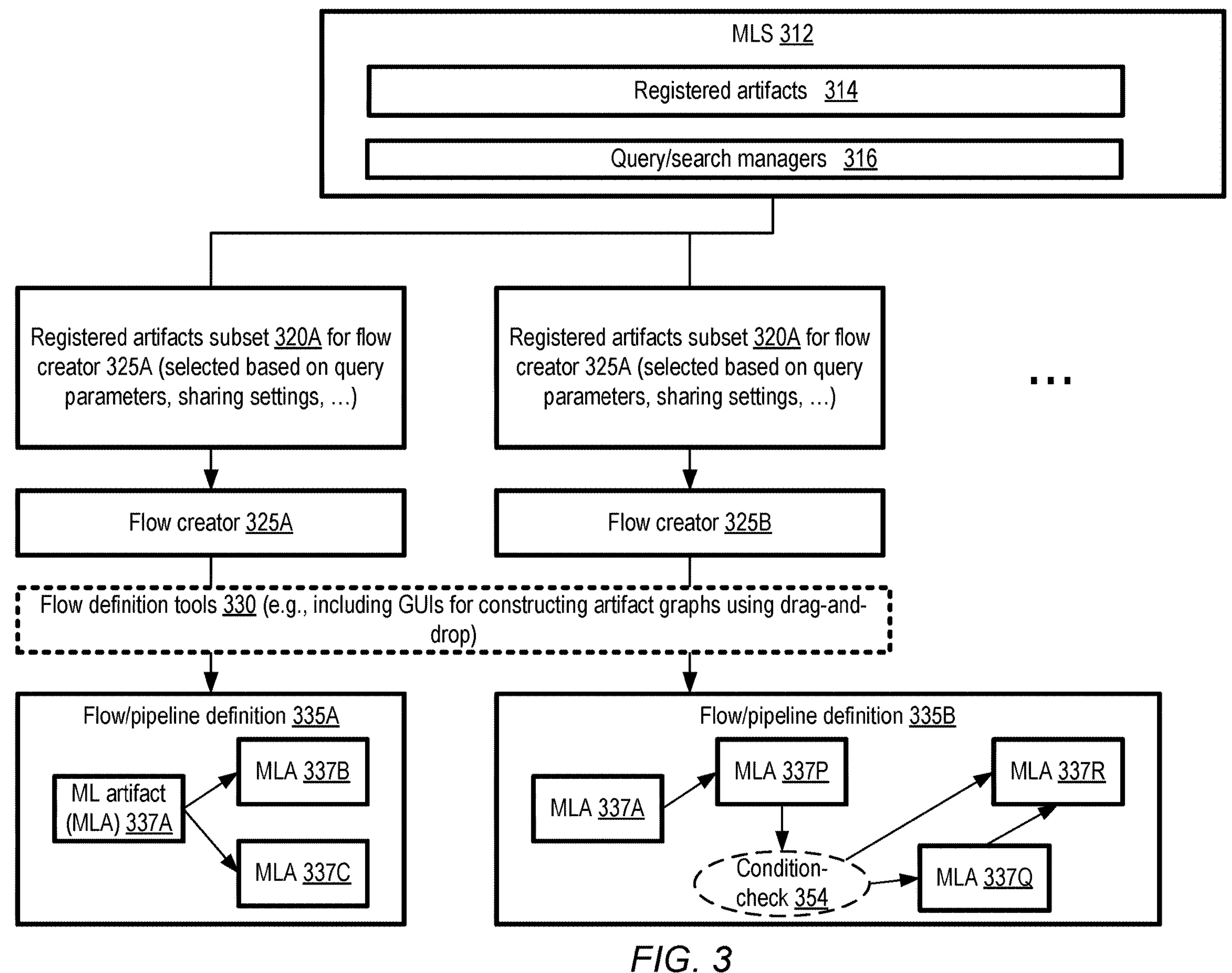
FIG. 3 illustrates examples of the creation of machine learning flow definitions by constructing graphs of registered artifacts, according to at least some embodiments.

FIG. 3 illustrates examples of the creation of machine learning flow definitions by constructing graphs of registered artifacts, according to at least some embodiments. Machine learning service (MLS) 312, similar in features and functionality to MLS 102 of FIG. 1, may comprise a repository of registered artifacts 314 as well as a set of query/search managers 316 in the depicted embodiment.

Flow creators 325 (e.g., 325A or 325B) such as data scientists may submit queries or search requests to the MLS 312 indicating values of one or more attributes of artifacts which the flow creators would like to use to define machine learning flows. Respective subsets 320 (e.g., 320A or 320B) of the registered artifacts 314 may be presented to the flow creators 325, e.g., via graphical or other programmatic interfaces of the MLS 312. The subset of registered artifacts provided to a given flow creator 325 may be selected by the query/search managers based on factors such as the sharing settings of the artifacts, the query or search parameters provided by the flow creator, the identity or group membership of the flow creator, and so on.

A flow creator 325 may examine the information about the registered artifacts (e.g., including some or all of the kinds of artifact metadata discussed in the context of FIG. 2) and decide whether the available artifacts are sufficient to create a new pipeline or flow. If some of the functionality needed is missing from the subset 320 of artifacts accessible to the flow creator, the flow creator may in some cases create a new artifact and submit a registration request for it to the MLS.

The MLS may provide a set of flow definition tools 330 (e.g., including graphical user interfaces for constructing artifact graphs using drag-and-drop interface elements) in the depicted embodiment. Using such tools 330, a flow creator may generate a flow/pipeline definition 335, such as 335A or 335B. Individual flow definitions may comprise a respective directed acyclic graph comprising a plurality of nodes, each representing a respective ML artifact (MLA), with the edges between nodes indicating the direction of transmission of data (such as intermediary results, derived features, etc.) between the nodes. Thus, for example, definition 335A comprises MLAs 337A, 337B and 337C, while definition 335B comprises MLAs 337A, 337P, 337R and 337Q. Some flow definition nodes may not necessarily represent artifacts as such in the depicted embodiment, but instead may represent logic such as condition checks which may be used to decide the specific destination node to which data should be sent from among a number of potential destination nodes. For example, condition-check node 354 is used in definition 335B to determine whether output from MLA 337P should be sent directly to MLA 337R or via an intermediary MLA 337Q. Note that a given registered artifact may be employed in several flow definitions in at least some embodiments; for example, MLA 337A is used for definition 335A as well as 335B. In some embodiments, a given same artifact, deployed at the same underlying resource, may be used to implement nodes of two different flows at run time; thus, artifacts may be shared not only between flow definitions but also between running instances of different flows. For example, a particular node of an instance of a first machine learning flow may be configured such that (a) data of the first machine learning flow are processed at the particular node and (b) data of a second machine learning flow, corresponding to a second flow definition request and deployment request, are processed at the particular node.

As indicated by the example definitions of FIG. 3, the graphs of the flow definitions may include forks (scenarios in which output from a given node may be sent to multiple other nodes) and/or joins (scenarios in which input from several nodes is consumed at a single node) in at least some embodiments. Note that while the flow definitions 335 may indicate logical relationships, sequentiality and/or possible parallelism among their constituent artifacts, they may not specify mappings between nodes and resources at which the nodes should be run. In some embodiments, a given flow may contain loops or cycles—e.g., if an iterative algorithm is to be run which involves output from a node N1 being consumed at another node N2 in a given iteration, and then output from node N2 being consumed by N1 for the next iteration. In some embodiments, flow definitions may be specified in text format (e.g., using a scripting language or markup language) instead of or in addition to via graphical user interfaces.

Example Flow Definition Registration Procedure

Figure 4:
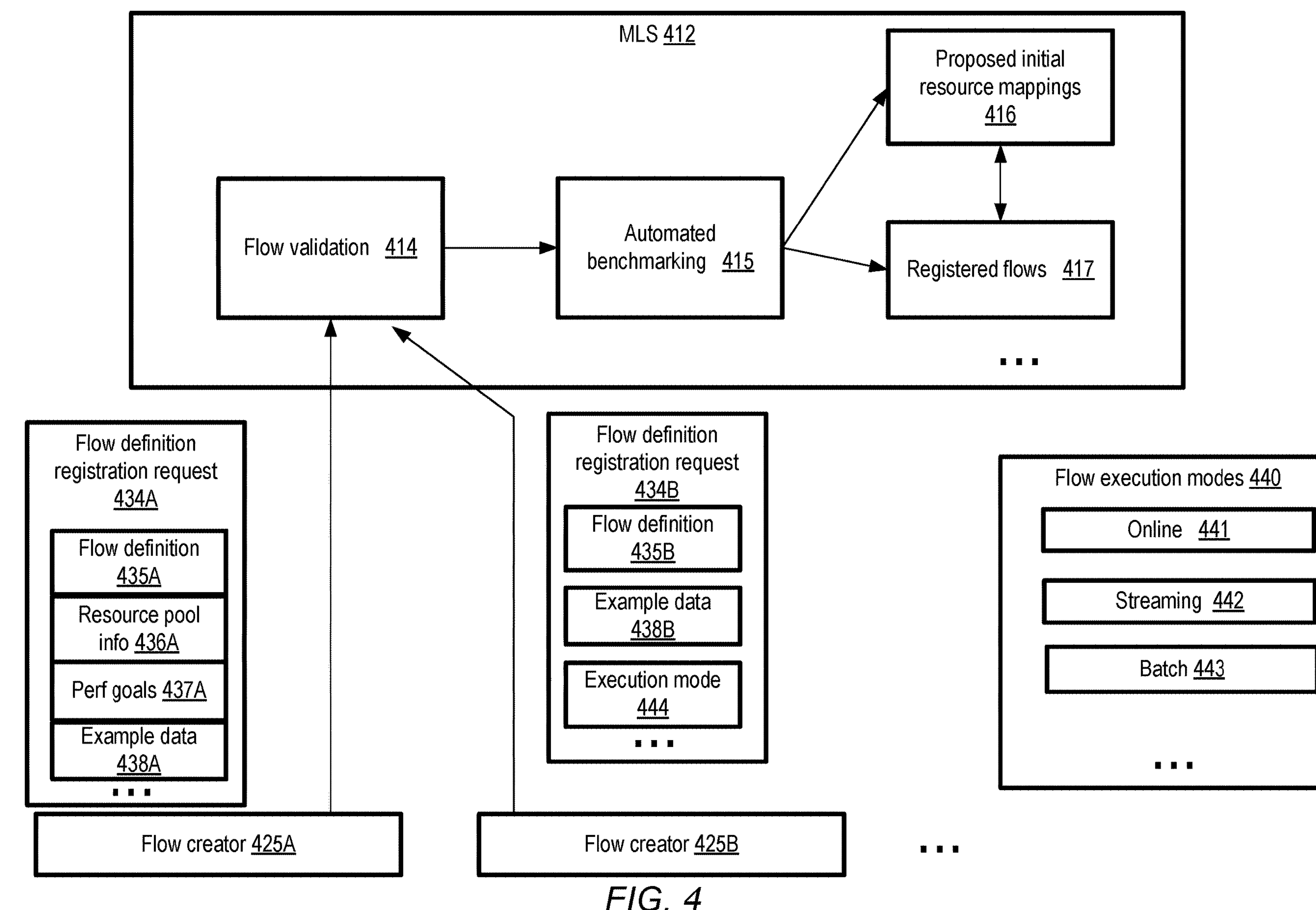
FIG. 4 illustrates examples of operations which may be performed at a machine learning service in response to flow registration requests, according to at least some embodiments.

FIG. 4 illustrates examples of operations which may be performed at a machine learning service in response to flow registration requests, according to at least some embodiments. After flow definitions have been generated using flow definition tools of a machine learning service (MLS) 412 similar in functionality to MLS 102 of FIG. 1 by respective flow creators 425, registration requests 434 (e.g., 434A or 434B) for the flow definitions may be sent to the MLS in various embodiments by the flow creators.

A given flow definition registration request 434 may indicate or include a representation of a flow definition as well as one or more attributes of the flow definition in some embodiments. For example, flow definition registration request 434A submitted by flow creator 425A may include flow definition 435A (e.g., one or more files listing the nodes and edges of a graph of artifacts, similar to the graphs shown in FIG. 3), resource pool information 436A indicating a set of resources (on at least a subset of which the artifacts represented by flow definition 435A can be executed), a set of performance goals 437A for the flow definition 435A and example data 438A which can be provided as input to an instance of the flow definition 435A. Flow definition registration request 434B specifies a different flow definition 435B, example data 438B and an execution mode 444 for instances of the flow definition 435B. In some embodiments, the MLS 412 may support several different execution modes 440 for machine learning flows, such as online mode 441, streaming mode 442 and batch mode 443, and a flow definition registration request 434 may indicate one or more such preferred execution modes in which the flow definition is expected to be used. In online mode 441 (which may also be referred to as real-time execution mode), typically expected to be used for single input records at a time or a few input records at a time, the network connection on which a request for an execution of an instance of a flow may also be used to provide the results of the instance execution. In streaming mode 442, a long-running stream of input records may be provided for the instance of a flow definition, and corresponding long-running streams of output may be expected from the instance. In batch mode 443, a large group of input records may be submitted for an instance of a flow, and the results for the group may be provided in an asynchronous manner.

As indicated in FIG. 4, the types of elements included in a flow definition registration request 434 may differ for different requests. In some embodiments, one or more of the elements may be inferred at the MLS if it is not provided in a flow definition registration request. For example, information about the resource pool which is expected to be used to deploy instances of a given flow definition may be inferred at the MLS 412 based on the user account or client account of the submitter of the registration request. The MLS may be able to identify the set of compute instances of various types (e.g., compute instances with a large number of GPUs, compute instances with high persistent I/O performance capability, etc.) allocated to the client account, and assume that those compute instances are candidates for deploying instances of the flow definition whose registration is being requested. Similarly, if performance goals are not specified, in some embodiments the MLS may infer (e.g., based on similarity of the submitted flow definition to other registered flow definitions of the same client) the kinds of performance metrics which are likely to be if interest.

In response to a flow definition registration request 434, one or more flow validation or verification operations 414 may be conducted at the MLS in the depicted embodiment. Such validation operations may include, for example, ensuring that the inputs and outputs of connected nodes of the flow are compatible, so that the data types and/or schema of the results of any given node match the expected input schema of other nodes to which the results would be directed. Other validation operations may include, for example, ensuring that the same problem domain is being addressed by the different artifacts represented in the flow definition—e.g., a given flow definition may be rejected if its output pertains to object recognition within images, but the input comprises text-only documents. In effect, the validation operations may verify that the components of a given flow belong together from a logical perspective.

In addition to the validation operations, in various embodiments, automated benchmarking 415 of the flow definition may be conducted. In such benchmarking operations, the MLS 412 may try to execute instances of the flow using one or more combinations of available resources (e.g., as indicated in the resource pool information associated with the registration request 434, and/or based on the targeted flow execution mode) and example data 438, and determine performance results of such executions. The kinds of tests run during benchmarking, and the performance metrics obtained, may vary with the expected execution mode of the flow in some embodiments. In embodiments in which the client submits performance goals such as 437A or the MLS is able to infer the performance goals, several different iterations of performance tests may be conducted until a configuration or resource mapping is identified which is able to satisfy the performance goals. Each resource mapping may indicate, for each of the nodes of the flow, a resource on which the corresponding artifact should be run. A resource mapping which satisfies the performance goals may be selected as a proposed initial resource mapping 416 in the depicted embodiment. In some cases, a configuration which meets the performance goals may not be found in the time set aside for the benchmarking, in which case a mapping which provides the best performance among the tested configurations may be selected as a proposed initial resource mapping 416. The proposed initial resource mappings 416 and representations of the registered flows 417 may be stored at the MLS 412 in the depicted embodiment, and one or more messages acknowledging the successful validation, benchmarking and registration of the flow definition may be sent to the flow creator 425 in some embodiments. In at least one embodiment, in addition to performance results (such as the total time it took to generate predictions for example data 438), metrics of machine learning model inference quality (e.g., precision, recall, etc., depending on the kind of models involved) may also be provided to the flow creators and/or to other destinations.

Example Flow Instance Deployment

Figure 5:
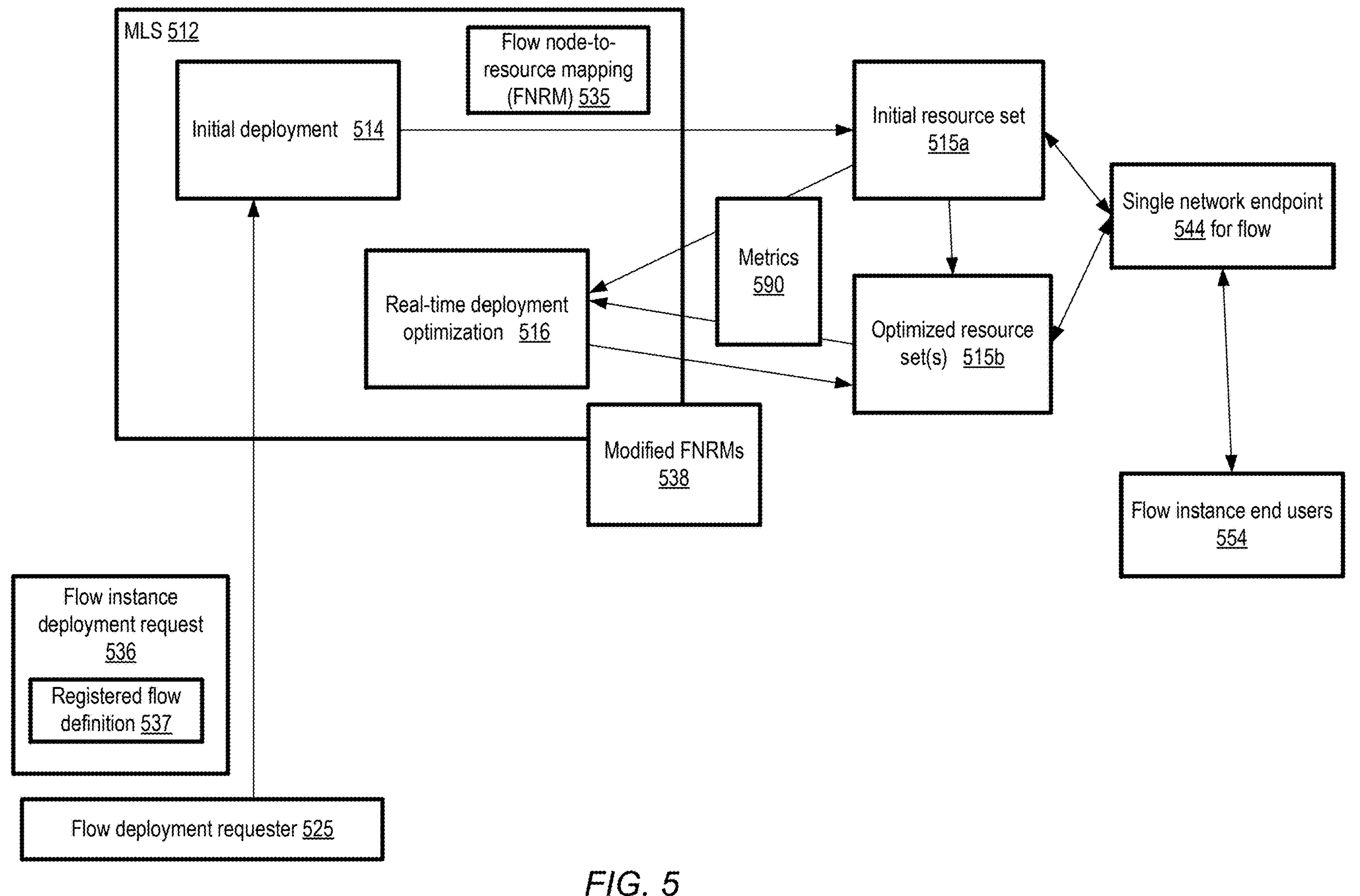
FIG. 5 illustrates examples of tasks which may be performed at a machine learning service in response to flow instance deployment requests, according to at least some embodiments.

FIG. 5 illustrates examples of tasks which may be performed at a machine learning service in response to flow instance deployment requests, according to at least some embodiments. A flow deployment requester 525 may submit a flow instance deployment request 536 indicating a registered flow definition 537 in the depicted embodiment an MLS 512 similar in features and functionality to MLS 102 of FIG. 1, without indicating the specific resources to be used for each node of the flow. In response, a flow instance deployment coordinator of the MLS may implement an initial deployment 514 of an instance of the specified flow, e.g., using the proposed initial resource mappings which were generated for the specified flow during the benchmarking efforts discussed earlier. In the initial deployment 514, an initial resource set 515*a* (selected for example from a pool of resources indicated in the deployment request or in the flow definition registration request for the specified flow) may be identified for the nodes of the flow. An initial flow node-to-resource mapping (FNRM) 535 may be generated by the deployment coordinator, identifying the specific resource on which each artifact of the flow instance is to be run. In at least some embodiments, a single network endpoint 544 (or a small number of such endpoints) may be configured for the flow instance, e.g., an IP address or URI which can be used to send input and/or receive output from the flow instance by flow instance end users 554. In at least some embodiments, an orchestrator process or component may be assigned to each flow instance to manage input and output of the flow instance as a whole, as well as the coordination of data transmitted between nodes of the flow instance, as discussed below in further detail.

After the initial deployment, an iterative real-time deployment optimization procedure 516 may be implemented in various embodiments with respect to the running instance of the flow. Various types of metrics 590 (including for example resource utilization metrics, network traffic metrics, I/O latency metrics, artifact-specific metrics which indicate the performance of various logical components of the flow and the like) may be collected for the optimization in the depicted embodiment. Based on the analysis of the metrics 590, modified FNRMs 538 may be generated in at least some embodiments, causing the migration of some nodes of the flow from one resource to another, or adding new resources at which additional copies of the artifacts of the flow can be run. Optimized resource sets 515*b* may be utilized for the nodes of the flow instance in accordance with such modified FNRMs in the depicted embodiment, without having to modify the network endpoint 544 being used for the flow instance. The process of collecting metrics and determining whether node-to-resource mappings have to be modified may be performed continuously during the lifecycle of the flow instance in at least some embodiments.

Example Orchestration of Execution of a Flow Instance

Figure 6:
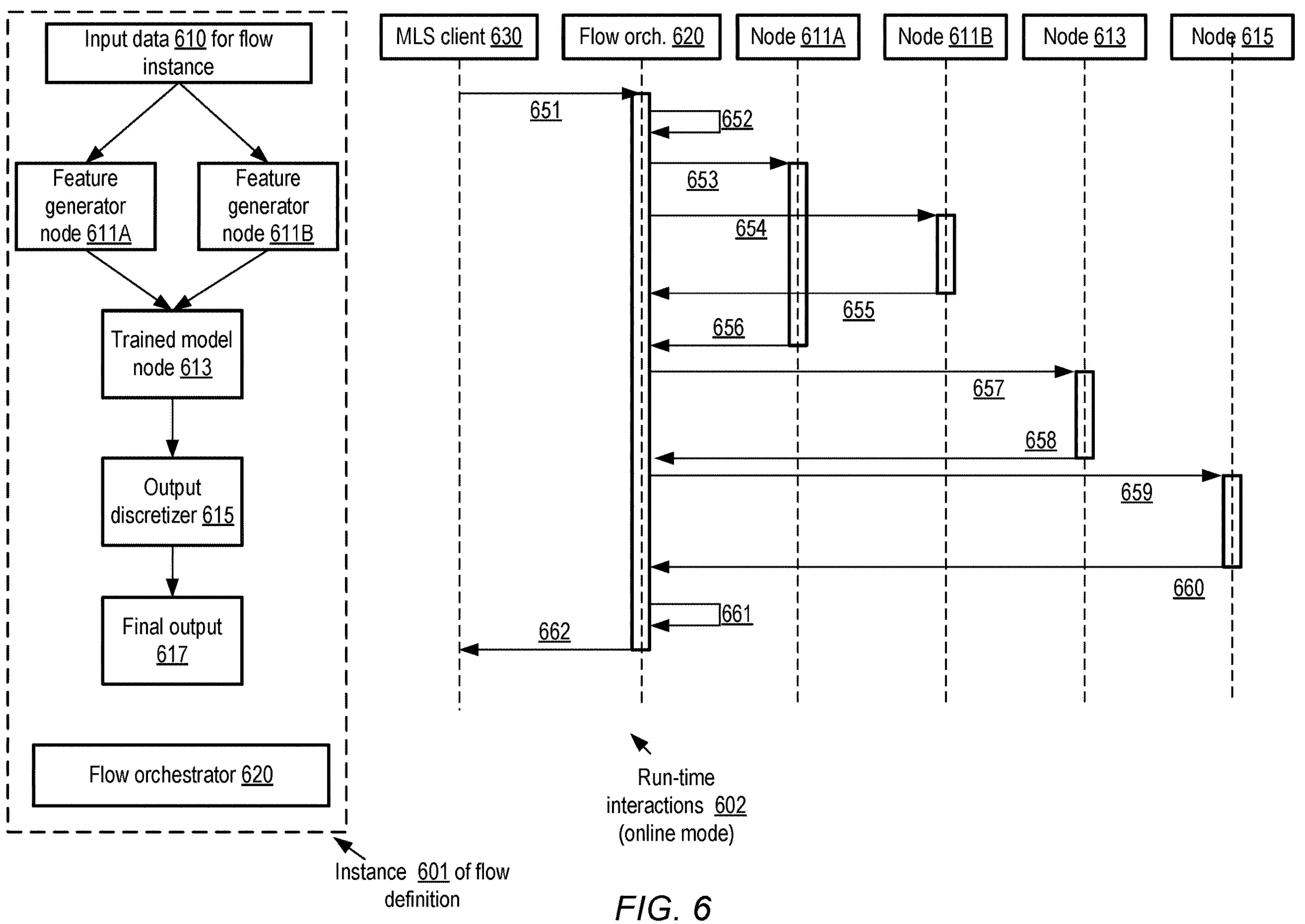
FIG. 6 illustrates examples of operations performed by a flow orchestrator during the execution of an instance of a machine learning flow, according to at least some embodiments.

In some embodiments, an orchestrator comprising for example one or more processes or threads of execution, may be assigned by the MLS to coordinate the interactions between the different components or artifacts making up a given running instance of a machine learning flow or pipeline. FIG. 6 illustrates examples of operations performed by a flow orchestrator during the execution of an instance of a machine learning flow, according to at least some embodiments. In the depicted example, a running instance 601 of a registered flow definition includes a pair of feature generator nodes 611A and 611B to which input data 610 for the flow instance are provided as input. Features generated at nodes 611A and 611B are provided as input to a trained model node 613, and the output of the trained model node 613 is transformed/processed at an output discretizer node 615 to obtain the final output 617. For example, if the trained model node 613 comprises a classification model which emits predicted class values as real numbers in the range 0.0 to 1.0, depending on the type of classification being performed, the real numbers may be transformed into integer values 0 or 1 by the output discretizer representing one of two binary classes, or into integer values 0, 1, 2, or 3 to represent one of four classes.

Run-time interactions 602 show the manner in which the flow orchestrator may operate in a scenario in which the flow instance is run in online execution mode. An MLS client 630 may transmit an input record to a network endpoint configured for the flow orchestrator 620, as indicated by arrow 651. In the depicted embodiment, the flow orchestrator may start a timer (indicated by arrow 652), which may be used to return an error if the result for the provided input record is not obtained from the flow instance within a selected time interval. The feature generators 611 may operate in parallel as indicated in the instance graph, so the flow orchestrator may send the input record to node 611A (arrow 653) and to node 611B (arrow 654) without waiting for either feature generator to complete its work. The orchestrator may then wait for both feature generators to complete their work. After the features have been generated (as indicated by arrows 656 and 655), the orchestrator may be able to transmit the combined set of generated features to the trained model node 613, as indicated by arrow 657. When the raw output from the trained model is obtained (arrow 658), the orchestrator may transmit the raw output to the discretizer node 615 (arrow 659) in the depicted example. The final output may be sent to the orchestrator by the discretizer (arrow 660). The orchestrator may log metrics pertaining to the interactions with the components of the flow (as indicated by arrow 661), disable the timer, and send the final output back to the client (arrow 662). As such, in the embodiment depicted in FIG. 6, MLS clients on whose behalf registered flow instances are run may only need to communicate (via an endpoint set up for the instance by the MLS) with a single orchestrator, and that orchestrator may then coordinate all the work done by the nodes of the flow. In at least some embodiments, the client may not be informed that an orchestrator is being used; from the client's perspective, the flow instance may be used by simply providing input to a network endpoint and receiving the output from that endpoint when it becomes available.

Example Mappings of Flow Nodes to Resources

Figure 7:
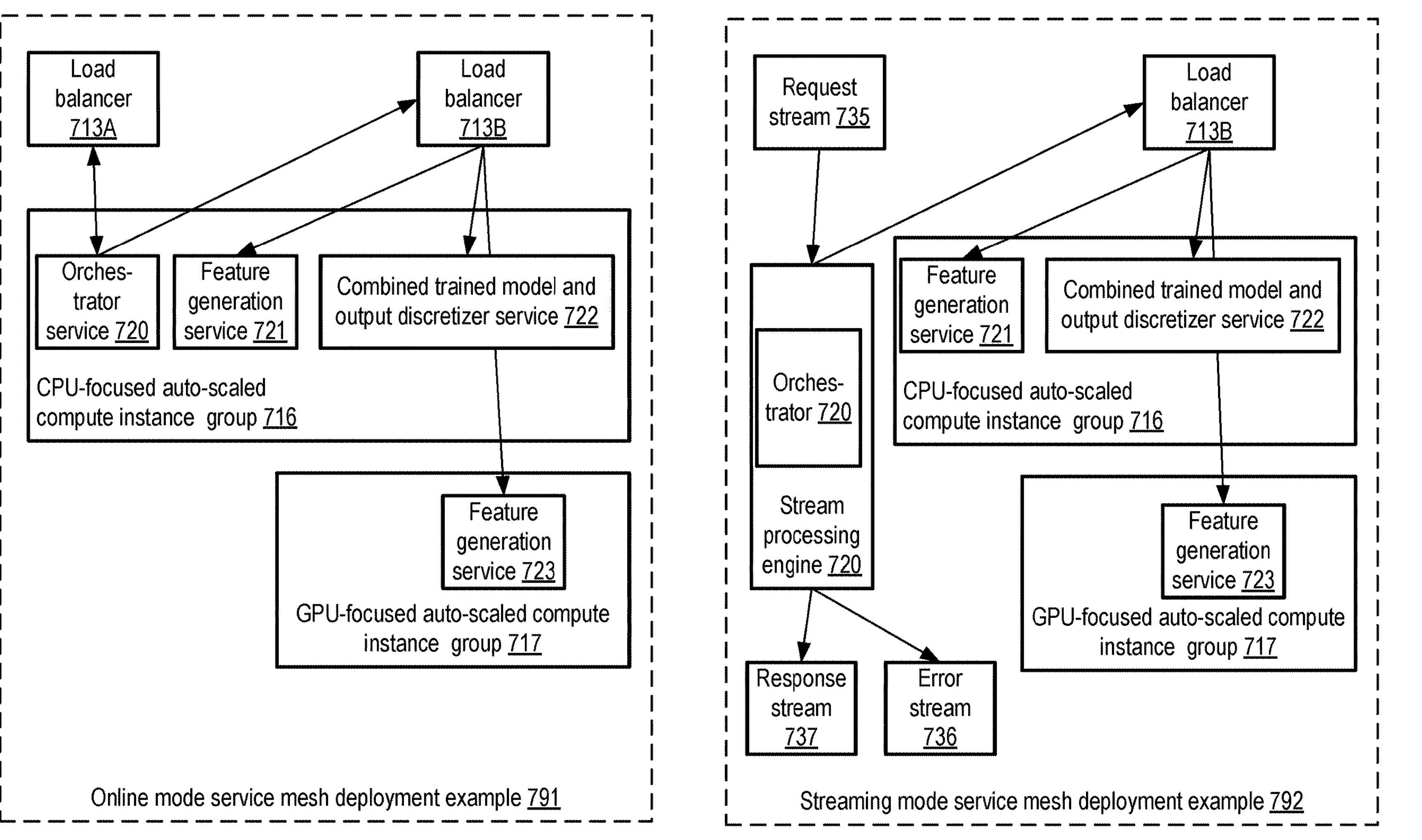
FIG. 7 illustrates examples of mappings of nodes of a machine learning flow to resource groups, according to at least some embodiments.

FIG. 7 illustrates examples of mappings of nodes of a machine learning flow to resource groups, according to at least some embodiments. In the depicted embodiment, a service oriented architecture is implemented for executing machine learning flows. In such an architecture, one or more components or nodes of the flow may be implemented as respective network-accessible services (which may also be referred to as micro-services or constituent services of the overall flow), and the combination of services may be referred to as a service mesh. One of the advantages of using a service oriented architecture is that the services interact with one another according to agreed-upon communication protocols and APIs, so the internal details of the individual constituent services may not have to be exposed to the other constituent services as long as the protocols remain in effect at each of the services. It thus becomes easier to manage the development lifecycle of the components of the overall service-oriented application (such as ML flows), as new versions of individual nodes can be used to replace older versions simply by directing the messages between the nodes to the newer versions.

In both online mode service mesh deployment example 791 and streaming mode service mesh deployment example 792, an orchestrator and flow nodes similar to those discussed in the context of FIG. 6 may be implemented as a collection of interacting services. In the online mode service mesh deployment example 791, a pair of load balancers 713A and 713B may be configured, e.g., using a load balancing service of a provider network or cloud computing environment. The first of the load balancers 713A may be used for receiving client input and transmitting final output to the client, while the other load balancer 713B may be used by the orchestrator for communicating with the nodes of the flow instance.

Two groups of compute instances of a virtualized computing service of a provider network may be used as the resources for executing the flow nodes. A CPU-focused auto-scaled compute instance group 716 may be configured for the orchestrator service 720, one of the feature generation services 721, and a service 722 which combines the functionality of the trained model node (node 613 shown in FIG. 6) and the output discretizer (node 615 of FIG. 6). The decision to combine the trained model and the output discretizer into a single service may be made at the MLS based on any of several factors in different embodiments—e.g., based on determining that the logic of the discretizer is unlikely to change, based on an indication that the overhead of transmitting raw output to a separate service for discretizing is too high, and so on. The compute instance group 716 may be described as CPU-focused because the CPUs assigned to the individual compute instances of the group may be expected to be more heavily utilized than other types of processors (such as GPUs) present on the physical servers being used for the compute instances. The compute instance group 716 may be said to be auto-scaled because the MLS may define rules which are to be used to add more compute instances to the group under specified conditions (e.g., if the average CPU utilization of the compute instances over a specified time interval exceeds X %), so that the performance of the services implemented at the compute instance group can scale automatically with the workload of the group.

A GPU-focused auto-scaled compute instance group 717 may be configured for the second feature generator service 723 in the depicted example, e.g., based on an indication in a resource affinity setting of the corresponding feature generator artifact that the feature generator is likely to perform better if powerful GPUs are available. The compute instance group 717 may be described as GPU-focused because the GPUs assigned to the individual compute instances of the group may be expected to be heavily utilized. Compute instance group 717 may also be auto-scaled in the depicted example. The mappings between the nodes of the machine learning flow and services, as well as the mapping between the services and compute instances, may be selected or determined based at least in part on benchmarking operations similar to those discussed above, as well as on resource affinity settings of the artifacts represented by the nodes in the flow in various embodiments.

In the streaming mode service mesh deployment example 792, similar CPU-focused and GPU-focused compute instance groups may be used for the nodes of the flow, but the orchestrator service may be mapped to a stream processing engine (implemented for example at a stream management service of the provider network). Input for the flow may be received via a request stream 735 (e.g., one or more sequences of input records), and two streams may be configured for the output produced by the flow instance. Response stream 737 may be set up for responses which did not involve errors, while an error stream 736 may be set up to send error messages in the cases where the processing of an input record from request stream 735 at the flow instance did result in an error. In both examples 791 and 792, the orchestrator may interact with the nodes of the flow (implemented as feature generation services 721, combined trained model and output discretizer service 722, and feature generation service 723) via load balancer 713B, performing similar coordination functions for a given input record as were shown in FIG. 6. In some embodiments, the deployment of the flow in batch execution mode may utilize similar groups of compute instances as shown in example 791, with the primary difference being that the final results for a given batch may be provided asynchronously to the orchestrator rather than synchronously. In one embodiment, scaling managers similar to those shown in FIG. 1 may establish auto-scaling groups of the type shown in FIG. 7. Other types of resource mappings may be used in different embodiments for machine learning flow instances than those shown in FIG. 7—e.g., a service oriented architecture may not necessarily be used, compute instances or load balancers may not be used, or auto-scaling may not be configured for at least some resources.

Example Flow Deployment Optimizations

Figure 8:
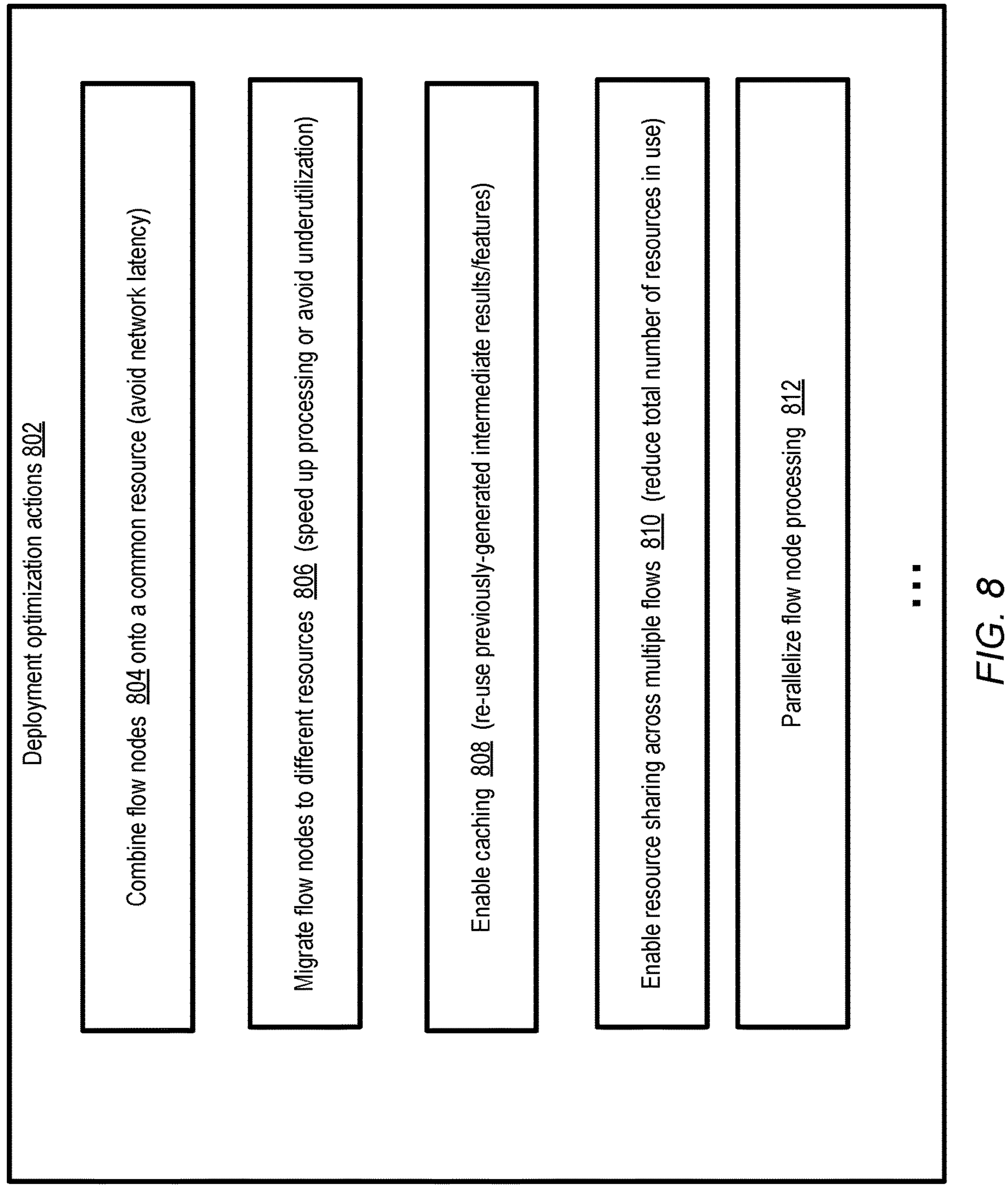
FIG. 8 illustrates examples of flow deployment optimization operations which may be performed at a machine learning service, according to at least some embodiments.

FIG. 8 illustrates examples of flow deployment optimization operations which may be performed at a machine learning service, according to at least some embodiments. After an instance of a machine learning flow is deployed to an initial set of resources by an MLS similar in features and functionality to MLS 102 of FIG. 1 as discussed earlier, components of the MLS may analyze various types of metrics from the instance. Based on analysis of the metrics, performance goals which may have been indicated for the flow instance, and/or resource utilization optimization objectives indicated by the client on whose behalf the instance is deployed, any combination of several kinds of deployment optimization actions 802 may be automatically initiated at the MLS.

In some cases, the MLS may determine that it may be helpful to combine some number or running flow nodes onto a common resource or service, e.g., to eliminate or avoid network latencies which might otherwise have been encountered if the flow nodes were executed at distinct resources. Such actions to combine flow nodes 804 may also be initiated in some cases in response to detecting high levels of network utilization between some the resources.

In some scenarios, some nodes of the flow may be migrated to different resources 806 from the ones on which they are currently running, e.g., instead of or in addition to combining some nodes at a single resource. This type of action may be initiated, for example, based on detecting that the processor, memory or storage utilization levels of the currently used resources is consistently above a threshold, and may help in speeding up the flow. In at least some embodiments, an auto-scaling rule of the kind discussed earlier may be used to initiate such migrations. Note that some migrations may move flow nodes from more powerful resources to less powerful resources, e.g., in an attempt to avoid wasting resource capacity.

For some types of machine learning flows, it may be feasible to enable caching 808, e.g., so that previously-generated intermediate results or features are retained and re-used where possible. In some embodiments, caching policies indicating the kinds of data to be retained, the type of memory or storage to be used for the retained data, the cache replacement and expiration policies to be used, and the like may be generated and applied by the MLS based on heuristics or knowledge base entries, without requiring clients to supply the policies. In one example of such caching, various types of features characterizing still images or video frames of an input data set, which are computationally expensive to derive, may be retained for some time as the same features may be used for different purposes in multiple flow instances or for repeated executions of the same flow.

In at least some embodiments, in order to reduce the total number of resources in use for a particular client or for a set of collaborating clients, individual resources may be shared among multiple flow instances, as indicated in element 810 of FIG. 8. For example, if a set of related inference jobs are to be performed for a given client, a cluster of compute instances for trained models may be re-used for several of the jobs. This type of action may reduce the resource costs of the client. Note that such sharing of resources may be implemented in some embodiments only after ensuring that the client or clients on whose behalf the flows are being run have agreed to resource sharing (e.g., via an opt-in interface); the MLS may always ensure that proper security is maintained over the data being processed and of the flows themselves.

Another deployment optimization action which may be initiated in some embodiments is to parallelize flow node processing 812, e.g., by launching replicas of a given node and distributing the input for the node among such replicas. This type of action may be initiated, for example, when the MLS is able to determine that the processing of individual subsets of the node's input is logically independent of the processing of other subsets, that is, that the processing is not required to be sequential. Such parallelization may be especially beneficial in the batch or bulk mode of operation, when very large amounts of input have to be processed. Other types of deployment optimization actions, not shown in FIG. 8, may be implemented in various embodiments.

Example Categories of Programmatic Interactions

Figure 9:
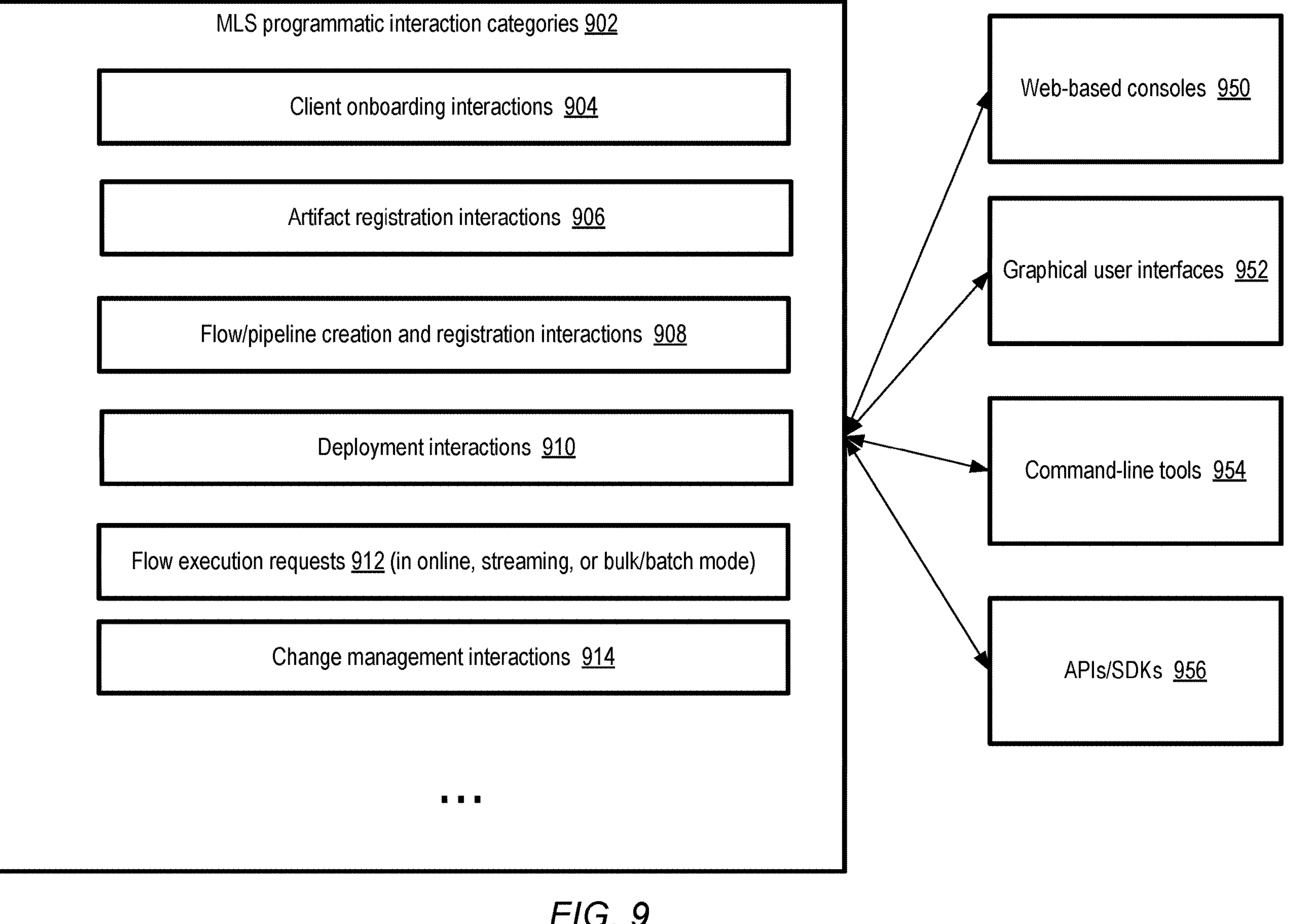
FIG. 9 illustrates example categories of programmatic interactions pertaining to machine learning artifacts and flows, according to at least some embodiments.

Several types of programmatic interactions may be supported at a machine learning service similar to MLS 102 of FIG. 1 in various embodiments. FIG. 9 illustrates example categories of programmatic interactions pertaining to machine learning artifacts and flows, according to at least some embodiments. Programmatic interfaces usable for some or all of the MLS programmatic interaction categories 902 may include one or more web-based consoles 950, graphical user interfaces 952, command-line tools 954, application programming interfaces (APIs) of software development kits (SDKs) 956 and the like.

Client onboarding interactions 904 may include, for example, account setup requests in various embodiments, in which clients indicate the user or group accounts (e.g., accounts defined in an access management service or an identity management service of a provider network) that will be used to request registration of artifacts and flow definitions, and to request deployment of instances of the flows. In some embodiments, clients may designate default sharing policies for their artifacts, flows, and/or resources pools—e.g., that account A1 should be able to view artifacts created by account A2, or share resources with those of account A2 for instances of their flows.

Artifact registration interactions 906 may include requests to specify artifacts and associated metadata, including the artifact category, sharing mode settings, resource affinity settings, targeted use case or application information, input and output signatures or specifications, and so on in some embodiments. In at least one embodiment, individual artifacts may be packaged as software containers, and the locations from which the machine images of the artifacts can be obtained may be indicated in the registration artifacts. In at least one embodiment, a container management service of a provider network may be used to store the images of the containers of artifacts, and an artifact registration request may specify the identifier assigned to an artifact's container at the container management service and/or the credentials needed to access the container.

A number of flow or pipeline creation and registration interactions 908 may be supported at the MLS in the depicted embodiment. In some embodiments, clients may generate new flows or pipelines using a graphical interface which displays icons representing artifacts in response to artifact queries or search requests, and provides drag-and-drop capabilities allowing clients to generate graphs of selected icons (as well as logic nodes such as condition checking nodes) to represent new flows or pipelines. In at least one embodiment, instead of or in addition to using such graphical interfaces, a client may specify a flow definition in one or more text files using a scripting language, a markup language or a programming language. Registration requests for the created flow definitions may be submitted via the programmatic interfaces in various embodiments, and the flow definitions may be registered at the MLS after verification and/or benchmarking as discussed earlier. In some embodiments, based for example on the results of the benchmarking, an initial set of resources may be assigned for an instance of a registered flow.

Via deployment interactions 910, a client may submit deployment requests for an instance of a specified registered flow, request a termination of deployment of the instance, request a migration of a flow from one set of resources to another, and so on in various embodiments. Flow execution requests 912 may specify the input for which results are to be obtained from a deployed instance of a specified flow, e.g., in online mode, streaming mode or bulk/batch mode. Change management interactions 914 may enable clients to update versions of artifacts and flows, request hot swaps of artifact versions, and so on in various embodiments. In some embodiments, additional programmatic interactions, not shown in FIG. 9, may for example enable clients to view metrics pertaining to their flows (such as resource consumption metrics, custom metrics defined by the clients for their artifacts or flows, start and end times for various operations of a flow, and so on). Clients may also use programmatic interactions to enable or disable performance optimization features such as caching in some embodiments. In at least one embodiment, some of the types of programmatic interactions shown in FIG. 9 may not be supported.

Methods for Machine Learning Artifact and Pipeline Management

FIG. 10 is a flow diagram illustrating aspects of operations that may be performed to register machine learning artifacts and define machine learning flows at a network-accessible machine learning service, according to at least some embodiments. As shown in element 1001, respective sets of metadata may be stored in response to artifact registration requests received via programmatic interfaces at an MLS similar in features and functionality to MLS 102 of FIG. 1 in the depicted embodiment. A given artifact may, for example, comprise a set of programs (and associated configuration information) packaged as a software container or other similar packaging unit in some embodiments. Several different types of artifacts may be registered in response to corresponding requests in various embodiments, such as machine learning input processors, feature generators, trained models, model output processors/transformers and the like. A registration request may indicate values of various attributes of an artifact, at least some of which may be stored as part of the metadata at the MLS, such as a sharing mode setting, a resource affinity setting (indicating for example the type of resource, such as CPUs versus GPUs versus memory, which are likely to be consumed to the greatest extent during execution of the artifact, and which should therefore preferably be used to select resources for deploying the artifact), and so on.

In various embodiments, information on filtered subsets of the registered artifacts may be provided to MLS clients in response to respective artifact queries, as indicated in element 1004. The presented artifacts may be selected based on their sharing mode settings, the identity or account information of the submitter of the query, the search attributes indicated in the query, and so on.

In response to a flow definition request, a representation of a graph (e.g., a directed acyclic graph or a graph that includes a set of cycles with restrictions on the total number of cycles) representing a pipeline of logical machine learning operations may be stored at the MLS in at least some embodiments (element 1007). At least some nodes of the graph may represent respective registered artifacts; in some embodiments, nodes that represent logic such as condition checking, aggregation or splitting of data, etc. may also be included in the graph. Edges of the graph may represent data or results flowing between the artifacts represented by the nodes. In various embodiments, the flow definitions (also referred to as pipeline definitions) may not indicate mappings between the nodes and specific resources to be used for executing the corresponding artifacts. Networking settings may also not be indicated—e.g., the types of network communication protocols to be used, or the bandwidth requirements for the edges, may not be specified in a flow definition request in various embodiments.

The specified flow definition may be verified and benchmarked in the depicted embodiments before it is accepted or registered at the MLS. To validate a flow (element 1010), the MLS may for example check whether the input and output signatures of the artifacts represented by the nodes are compatible—that is, if node N1 is to send output to node N2, data conforming to the output specification of N1 should be acceptable as input by N2. Other types of validation operations may be conducted in some embodiments, such as verifying that the use cases of the artifacts represented by the nodes meet a similarity criterion with respect to one another, and so on.

An automated benchmarking operation may be conducted with respect to the flow definition (element 1013) in at least some embodiments. In such an operation proposed types of resources for the individual artifacts of the flow may be selected from a pool of resources available for the flow definition (e.g., a set of compute instances allocated to the client who submitted the flow definition). The types of resources may be selected, for example based on performance goals of the flow, resource affinities of the artifacts of the flow, an execution mode (e.g., online vs. streaming vs. batch execution) specified by the client for the flow, and/or performance results obtained at various resources using a client supplied input data set or an MLS-selected input data set in some embodiments. In effect, a set of performance tests may be conducted, with different resources (e.g., a compute instance with performance capability P1, another compute instance with performance capability P2, etc.) being tried out for a given node if needed, in an attempt to identify a suitable proposed resource configuration in which respective artifacts represented by the nodes are mapped to a subset or all of the available types of resources. Benchmarking results, which may include performance metrics (such as the time taken to generate predictions for N input data records, the CPU/GPU/memory utilizations at various resources selected, the network latencies between nodes, etc.), as well as machine learning inference quality metrics (e.g., precision, recall, accuracy, etc.) may be provided to the flow definition request submitter in at least some embodiments. If the validation test results are successful and the benchmarking results are determined to be satisfactory by the MLS (and/or by the client), a representation of the flow definition may be stored at a repository of the MLS in at least some embodiments (element 1016). In various embodiments, if the validation test results fail or the benchmark results are not satisfactory, the submitter of the flow definition request may be informed accordingly, and the flow definition may not be accepted, stored or registered at the MLS.

FIG. 11 is a flow diagram illustrating aspects of machine learning flow deployment related operations that may be performed at a network-accessible machine learning service, according to at least some embodiments. As shown in element 1101, in response to a deployment request, an initial set of resources (such as one or more categories of compute instances of a cloud-based virtualized computing service) to be used for an instance of a registered/approved machine learning flow or pipeline may be identified. The particular resources be selected, for example, based on factors such as the results of an automated benchmarking operation conducted when the flow definition request was received, the resource affinity settings of the artifacts corresponding to the nodes of the flow, the available set of resources indicated in the deployment request, preferences indicated in the deployment request, and/or other factors. In effect, a flow-node-to-resource mapping may be selected for the instance, and execution of the various artifacts of the flow at the nodes to which they are mapped may be initiated. In embodiments in which individual artifacts are implemented using respective software containers, the container images may be retrieved from locations specified in the artifact registration requests earlier and executed at the selected resources. Networking-related configuration operations, such as the establishment of load balancers of the kind discussed in the examples shown in FIG. 7, the selection of Internet Protocol (IP) addresses for the endpoints to be used for communicating with the flow and within the flow, may be performed automatically in various embodiments by the machine learning service, without requiring the client requesting the deployment to configure the network connectivity manually.

As the execution of the flow instance proceeds, a number of different metrics may be collected and analyzed from the nodes of the instance and the underlying resources (element 1104). The metrics collected may include, for example, resource utilization levels for CPUs, GPUs, memory, storage devices, network links and the like, the start and end times of various phases of the computations of the flow, network latencies for messages transmitted among the resources, and so on. Some of the metrics may be collected using tools provided by the operating systems or virtualization managers in use at the resources, while other metrics may be collected from networking infrastructure tools of the provider network at which the resources are run, and/or from instrumentation hooks in the machine learning frameworks or libraries being used.

Based at least partly on the results of the analysis of the metrics and/or on flow/pipeline performance objectives obtained from the client, the mappings between the resources and the nodes of the flow may be modified dynamically in the depicted embodiment (element 1107). In some embodiments, in addition to or instead of changing which particular resources are used to execute one or more nodes, other performance-impacting configuration changes may be made dynamically, without requiring the client on whose behalf the flow instance has been deployed to provide specific guidance for the changes. Several different nodes may be run together at a single resource, more copies of a given artifact may be instantiated, caching or pre-fetching may be enabled for various types of intermediate results or generated features at one or more nodes, and so on. A continuous process of collecting and analyzing metrics and dynamically re-configuring the instance of the flow as needed may be implemented on at least some embodiments. Records of the changes made to the configurations of the flow instances, and the results achieved as a result, may be added to a database or knowledge base of the MLS in various embodiments (element 1110). Such records may be used, for example, to help with the resource mappings to be employed for subsequent deployments of similar flows in the future.

It is noted that in various embodiments, some of the operations shown in FIG. 10 and/or FIG. 11 may be implemented in a different order than that shown in the figure, or may be performed in parallel rather than sequentially. Additionally, some of the operations shown in FIG. 10 and/or FIG. 11 may not be required in one or more implementations.

Example Provider Network Environment

Figure 12:
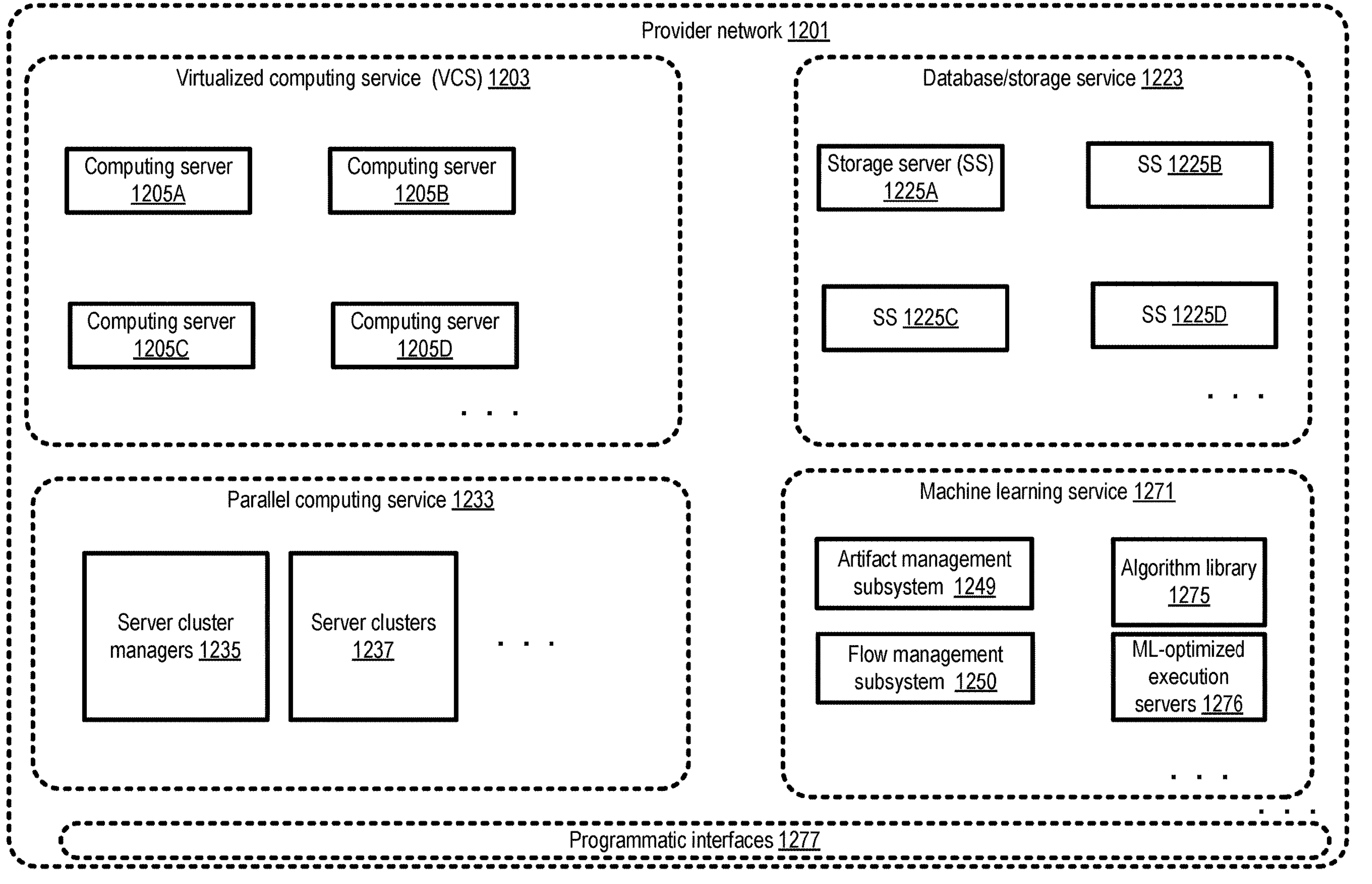
FIG. 12 illustrates an example provider network environment in which a machine learning service may be implemented, according to at least some embodiments.

In some embodiments, as mentioned earlier, a machine learning service at which artifact sharing and flow deployment optimizations similar to those described above are supported may be implemented at a provider network. FIG. 12 illustrates an example provider network environment in which a machine learning service may be implemented, according to at least some embodiments. In the depicted embodiment, provider network 1201 may comprise resources used to implement a plurality of services, including for example a virtualized computing service (VCS) 1203, a database/storage service 1223, and a parallel computing service 1233 as well as a machine learning service 1271 within which automated performance analysis of the kind discussed above may be conducted. The machine learning service 1271, which may also be referred to as an analytics service or an artificial intelligence service, in turn may comprise algorithm library 1275, artifact management subsystem 1249 at which various types of machine learning artifacts may be registered (including models trained using algorithms from library 1275), flow management subsystem 1250 at which pipelines or flows created by the clients of the MLS may be validated, benchmarked and deployed, and machine learning-optimized execution servers 1276 (e.g., servers comprising chipsets developed specifically for ML tasks) in the depicted embodiment. The parallel computing service 1233 may include various server clusters 1237, each comprising a plurality of servers, on which parallelizable workloads may be distributed by a set of server cluster managers 1235 in the depicted embodiment. Some of the algorithms implemented at the machine learning service 1271 (e.g., at some operations of registered pipeline flows) may be parallelizable, and may utilize the server clusters 1237 in at least some embodiments. In at least one embodiment, the provider network 1201 may include a software container management service which may be employed to create and store container images of the artifacts used to construct the flows.

Components of a given service may utilize components of other services in the depicted embodiment—e.g., for some nodes of deployed machine learning flows, virtual machines implemented at computing servers such as 1205A-1205D of the virtualized computing service 1203 may be used, server clusters 1237 and/or cluster managers 1235 may be utilized for parallelizable computations, input data, metrics and/or output produced at the machine learning service may be stored at storage servers 1225 (e.g., 1225A-1225D) of storage service 1223, and so on. Individual ones of the services shown in FIG. 12 may implement a respective set of programmatic interfaces 1277 which can be used by external and/or internal clients (where the internal clients may comprise components of other services) in the depicted embodiment.

Use Cases

The techniques described above, of enabling the controlled sharing and optimized deployment of pipelines of machine learning tasks may be extremely beneficial in a variety of scenarios. Many machine learning problems are best addressed using very large neural network models, often with numerous internal layers and thousands of parameters to be learned. In order to run such models (as well as complex models which do not necessarily rely on neural networks), pipelines utilizing numerous resources (including for example CPUs, GPUs and/or custom chips developed for ML applications) for various data pre-processing and inference computations may be used. Often, some of the operations performed for a given machine learning task (such as pre-processing of text, audio, images or video input, deriving features by applying transformations or embeddings on the input, or producing inferences of a particular type) may be re-usable for other similar tasks. The proposed techniques, which allow MLS clients to share their artifacts for such operations, define pipelines or flows from the artifacts, and then have the pipelines validated, automatically benchmarked and then deployed without having to worry about configuration details may make it much easier to address new machine learning problems quickly and effectively. Furthermore, because of the automated deployment modifications, substantial resource savings may be obtained in the process of producing high-quality machine learning results.

Illustrative Computer System

Figure 13:
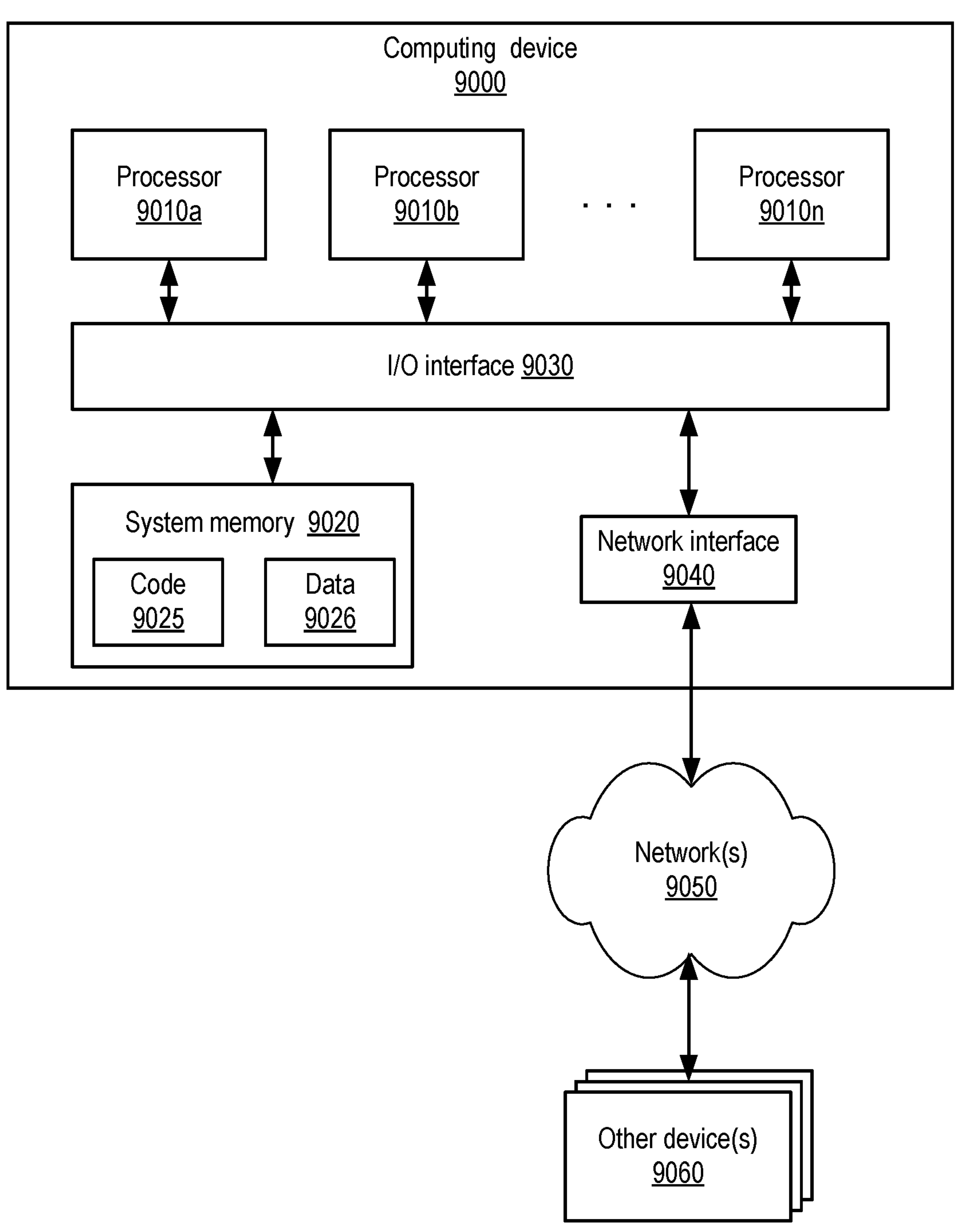
FIG. 13 is a block diagram illustrating an example computing device that may be used in at least some embodiments.

In at least some embodiments, a server that implements the types of techniques described herein (e.g., various functions of a machine learning service and other services of a provider network), may include a general-purpose computer system that includes or is configured to access one or more computer-accessible media. FIG. 13 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 12, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 12. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more computing devices;

wherein the one or more computing devices include instructions that upon execution on or across the one or more computing devices cause the one or more computing devices to:

store, by a network-accessible service, in response to one or more artifact registration requests, respective metadata of a plurality of machine learning artifacts comprising at least a first trained model and at least a first feature processor, wherein the metadata of a first machine learning artifact of the plurality of machine learning artifacts indicate a first sharing setting and a first resource affinity indicator, and wherein the metadata of a second machine learning artifact of the plurality of machine learning artifacts indicate a different sharing setting and a different resource affinity indicator;

cause to be presented, via an interface of the network-accessible service in response to an artifact query, an indication of at least a subset of the plurality of machine learning artifacts comprising the first trained model and the first feature processor, wherein the first trained model or the first feature processor is included in the subset based at least in part on the corresponding stored sharing setting metadata of at least the first trained model or the first feature processor;

determining, from among the presented at least a subset of the plurality of machine learning artifacts and based on input received via the interface, selection of one or more of the first trained model or the first feature processor;

store, by the network-accessible service in response to a flow definition request indicating the selected one or more of the first trained model or the first feature processor, a representation of a first machine learning flow comprising a directed acyclic graph, wherein the directed acyclic graph includes a plurality of nodes including a first node representing the first feature processor and a second node representing the first trained model, and wherein the flow definition request does not provide a mapping between (a) individual nodes of the plurality of nodes and (b) resources to be employed for the individual nodes;

implement an automated benchmarking operation with respect to the first machine learning flow at the network-accessible service without receiving a request for the automated benchmarking operation, wherein the automated benchmarking operation comprises:

selecting, based at least in part on respective ones of the stored resource affinity indicators, proposed types of resources for one or more of the plurality of nodes;

executing the plurality of nodes at different combinations of the proposed types of resources to obtain performance results for the different combinations of the proposed types of resources; and selecting, based at least in part on the performance results of the different combinations of the proposed types of resources, (a) a first type of resource for the first node and (b) a second type of resource for the second node; and deploy, by the network-accessible service, an instance of the first machine learning flow at a first group of the first type and second type of resources using a first mapping between nodes of the flow definition and resources of the first group, wherein the first mapping is based at least in part on a performance result of the automated benchmarking operation.

2. The system as recited in claim 1, wherein the one or more computing devices include further instructions that upon execution on or across the one or more computing devices further cause the one or more computing devices to:

initiate, at the network-accessible service after the instance of the first machine learning flow has been deployed using the first mapping, a collection of one or more metrics from the instance of the first machine learning flow; and automatically modify, by the network-accessible service, based at least in part on analysis of the one or more metrics, the first mapping to a second mapping, wherein according to the second mapping, at least one node of the first machine learning flow is executed at a different resource than in the first mapping.

3. The system as recited in claim 1, wherein the one or more artifact registration requests indicate (a) a first software container comprising executable software of the first trained model and (b) a second software container comprising executable software of the first feature processor.

4. The system as recited in claim 1, wherein the flow definition request indicates an execution mode of the first machine learning flow, selected from a set of modes including one or more of (a) an online mode, (b) a streaming mode, or (c) a bulk mode, and wherein the one or more computing devices include further instructions that upon execution on or across the one or more computing devices further cause the one or more computing devices to:

determine, at the network-accessible service, one or more configuration settings of the automated benchmarking operation based at least in part on the execution mode.

5. The system as recited in claim 1, wherein the one or more computing devices include further instructions that upon execution on or across the one or more computing devices further cause the one or more computing devices to:

cause to be provided, by the network-accessible service, one or more inference quality metrics obtained in the automated benchmarking operation.

6. A computer-implemented method, comprising:

storing, in response to one or more artifact registration requests for a machine learning service, respective metadata of a plurality of machine learning artifacts including a first machine learning artifact and a second machine learning artifact, wherein the metadata of the first machine learning artifact indicates a resource affinity and a first sharing setting indicating whether the first machine learning artifact is accessible to, or indicating restrictions on making the first machine learning artifact accessible to, clients of the machine learning service, and wherein the metadata of the second machine learning artifact indicates a different sharing setting;

providing for presentation, via an interface of the machine learning service and in response to an artifact query, an indication of at least a subset of the plurality of machine learning artifacts comprising a first trained model and a first feature processor, wherein at least the first trained model or the first feature processor is included in the subset based at least in part on the stored sharing setting, of the first trained model or the first feature processor, indicating whether the first trained model or the first feature processor is accessible to, or indicating restrictions on making the first trained model or the first feature processor accessible to, clients of the machine learning service;

determining, from among the presented at least a subset of the plurality of machine learning artifacts and based on input received via the interface, selection of one or more of the first trained model or the first feature processor;

generating, in response to a pipeline definition request indicating the selected one or more of the first trained model or the first feature processor, a representation of a first machine learning pipeline including respective nodes corresponding to a plurality of artifacts whose metadata were stored in response to the artifact registration requests, wherein the pipeline definition request does not provide a mapping between (a) individual nodes of the first machine learning pipeline and (b) resources to be employed for the individual nodes;

executing an automated benchmarking operation with respect to the first machine learning pipeline, wherein the automated benchmarking operation comprises:

selecting, based at least in part on respective ones of the stored resource affinity indicators, proposed types of resources for one or more of the plurality of nodes, the resources comprising a processor resource, a memory resource, or a networking resource;

executing the plurality of nodes at different combinations of the proposed types of resources to obtain performance results for the different combinations of the proposed types of resources; and selecting, based at least in part on the performance results indicating performance of one or more resources, (a) a first type of resource for a first node of the first machine learning pipeline and (b) a second type of resource for a second node of the first machine learning pipeline; and wherein an instance of the first machine learning pipeline is deployed at a first group of the first type and the second type of resources determined based at least in part on one or more of the performance results of the automated benchmarking operation.

7. The computer-implemented method as recited in claim 6, wherein the representation of the first machine learning pipeline comprises one or more of: (a) an indication that at least a subset of data processed in the first machine learning pipeline is to be directed from a plurality of source nodes to a particular destination node or (b) an indication that at least a subset of data processed in the first machine learning pipeline is to be directed from a particular source node to a plurality of destination nodes.

8. The computer-implemented method as recited in claim 6, further comprising:

presenting, in response to the artifact query, the indication of at least the subset of the plurality of machine learning artifacts.

9. The computer-implemented method as recited in claim 6, further comprising:

obtaining, via a programmatic interface, an indication of an example input data set for the first machine learning pipeline, wherein executing the automated benchmarking operation comprises utilizing the example input data set.

10. The computer-implemented method as recited in claim 6, further comprising:

deploying, in response to a deployment request, an instance of the first machine learning pipeline at a first group of resources.

11. The computer-implemented method as recited in claim 6, further comprising:

providing, in response to a deployment request, an indication of a network endpoint to which input for an instance of the first machine learning pipeline is to be directed.

12. The computer-implemented method as recited in claim 6, further comprising:

collecting one or more metrics from a first group of resources to which an instance of the first machine learning pipeline has been deployed; and causing, based at least in part in an analysis of the one or more metrics, at least one machine learning artifact to be migrated from one resource to another resource.

13. The computer-implemented method as recited in claim 6, further comprising:

configuring a particular node of an instance of the first machine learning pipeline such that (a) data of the first machine learning pipeline are processed at the particular node and (b) data of a second machine learning pipeline, corresponding to a second pipeline definition request, are processed at the particular node.

14. The computer-implemented method as recited in claim 6, wherein the one or more artifact registration requests indicate respective immutable executable images to be used for the first and second machine learning artifacts.

15. The computer-implemented method as recited in claim 6, wherein the one or more artifact registration requests indicate a first application use case to which the first machine learning artifact is directed, the computer-implemented method further comprising:

selecting the first machine learning artifact for inclusion in a response to an artifact search request based at least in part on a metric of similarity between (a) a target application use case indicated in the artifact search request and (b) the first application use case.

16. One or more non-transitory computer-accessible storage media storing program instructions that when executed on or across one or more processors cause the one or more processors to:

store, in response to one or more artifact registration requests, respective metadata of a plurality of machine learning artifacts including a first machine learning artifact and a second machine learning artifact, wherein the metadata of a first machine learning artifact of the plurality of machine learning artifacts indicates a sharing setting and a first resource affinity indicator, and wherein the metadata of a second machine learning artifact of the plurality of machine learning artifacts indicates a different resource affinity indicator;

provide for presentation, via an interface and in response to an artifact query, an indication of at least a subset of the plurality of machine learning artifacts, wherein a particular machine learning artifact is included in the subset based at least in part on the stored sharing setting of the particular machine learning artifact indicating whether the particular machine learning artifact is accessible to, or indicating restrictions on making the particular machine learning artifact accessible to, clients of the machine learning service;

determining, from among the presented at least a subset of the plurality of machine learning artifacts and based on input received via the interface, selection of one or more of the subset of the plurality of machine learning artifacts;

generate, in response to a pipeline definition request indicating the selected one or more of the subset of the plurality of machine learning artifacts, a representation of a first machine learning pipeline comprising a directed acyclic graph including respective nodes corresponding to a plurality of the machine learning artifacts whose metadata were stored in response to the artifact registration requests, wherein the pipeline definition request does not provide a mapping between (a) individual nodes of the first machine learning pipeline and (b) resources to be employed for the individual nodes;

execute a benchmarking operation with respect to the first machine learning pipeline, wherein the benchmarking operation comprises:

selecting, based at least in part on respective ones of the stored resource affinity indicators, proposed types of resources for respective ones of the plurality of nodes, the resources comprising a processor resource, a memory resource, or a networking resource; and executing a performance test of at least one artifact of the first machine learning pipeline on one or more of the proposed types of resources to obtain performance results indicating performance of the one or more proposed types of resources with respect to execution of the performance test, wherein the performance test includes executing an inference task using the at least one artifact on one or more types of resources in a pool of candidate resources; and selecting, based at least in part on the performance results indicating performance of the one or more proposed types of resources with respect to execution of the performance test, (a) a first type of resource for a first node of the first machine learning pipeline and (b) a second type of resource for a second node of the first machine learning pipeline; and wherein an instance of the first machine learning pipeline is deployed at a first group of the first type and the second type of resources determined based at least in part on one or more of the performance results of the benchmarking operation.

17. The one or more non-transitory computer-accessible storage media as recited in claim 16, wherein:

the pool of candidate resources is identified based on the pipeline definition request.

18. The one or more non-transitory computer-accessible storage media as recited in claim 16, storing further program instructions that when executed on or across the one or more processors further cause the one or more processors to:

perform a validation operation with respect to the first machine learning pipeline, wherein the validation operation comprises comparing an output signature of a first node of the first machine learning pipeline with an input signature of a second node of the first machine learning pipeline.

19. The one or more non-transitory computer-accessible storage media as recited in claim 16, storing further program instructions that when executed on or across the one or more processors further cause the one or more processors to:

initiate, after the instance of the first machine learning pipeline has been deployed using a first mapping between resources and nodes of the first machine learning pipeline, collection of one or more metrics from the instance of the first machine learning pipeline; and automatically modify, based at least in part on analysis of the one or more metrics, the first mapping to a second mapping, wherein according to the second mapping, at least one node of the first machine learning pipeline is executed at a different resource than in the first mapping.

20. The one or more non-transitory computer-accessible storage media as recited in claim 16, wherein the pipeline definition request indicates an execution mode of the first machine learning pipeline, selected from a set of modes including one or more of (a) an online mode, (b) a streaming mode, or (c) a bulk mode, and wherein the one or more non-transitory computer-accessible storage media store further program instructions that when executed on or across the one or more processors further cause the one or more processors to:

determine one or more configuration settings of the benchmarking operation based at least in part on the execution mode.

* * * * *